(12) United States Patent
Uekusa et al.

(10) Patent No.: US 10,015,431 B2
(45) Date of Patent: Jul. 3, 2018

(54) IMAGE PROCESSING APPARATUS AND IMAGE PROCESSING METHOD INCLUDING CONTROL WHETHER OR NOT TO PERMIT A READOUT REQUEST

(71) Applicant: CANON KABUSHIKI KAISHA, Tokyo (JP)

(72) Inventors: Tomotaka Uekusa, Yokohama (JP); Hiroyuki Yaguchi, Ichikawa (JP); Soichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/592,455

(22) Filed: May 11, 2017

(65) Prior Publication Data
US 2017/0332028 A1 Nov. 16, 2017

(30) Foreign Application Priority Data
May 12, 2016 (JP) .................................. 2016-095943

(51) Int. Cl.
 *H04N 5/378* (2011.01)
(52) U.S. Cl.
 CPC .................................. *H04N 5/378* (2013.01)
(58) Field of Classification Search
 CPC ..... H04N 5/378; G06F 12/14; G06F 12/1416; G06F 12/145
 See application file for complete search history.

(56) References Cited

U.S. PATENT DOCUMENTS

| 7,124,170 B1* | 10/2006 | Sibert ................... G06F 12/145 709/216 |
| 7,620,789 B2* | 11/2009 | Jeddeloh .............. G06F 13/1626 711/104 |
| 2013/0132690 A1* | 5/2013 | Epstein ............... G06F 12/1416 711/159 |
| 2016/0154586 A1* | 6/2016 | Craske .................. G06F 3/0604 711/202 |
| 2016/0283402 A1* | 9/2016 | Schulz .................. G06F 12/145 |

FOREIGN PATENT DOCUMENTS

JP        2003-323333 A        11/2003

* cited by examiner

*Primary Examiner* — Nicholas G Giles
(74) *Attorney, Agent, or Firm* — Carter, DeLuca, Farrell & Schmidt LLP

(57) ABSTRACT

An image processing apparatus including: a first acquisition unit configured to acquire write coordinates corresponding to a position of a pixel up to which writing is completed; a second acquisition unit configured to acquire readout coordinates corresponding to a position of a second block where readout is to be performed of a plurality of second blocks included in the image data written in the memory; and a controller configured to control whether or not to permit a readout request from a reading unit based on a positional relationship between the write coordinates acquired by the first acquisition unit and the readout coordinates acquired by the second acquisition unit, wherein the controller performs control so as not to permit the readout request from the reading unit if the positional relationship between the write coordinates and the readout coordinates does not satisfy a predetermined condition.

11 Claims, 10 Drawing Sheets

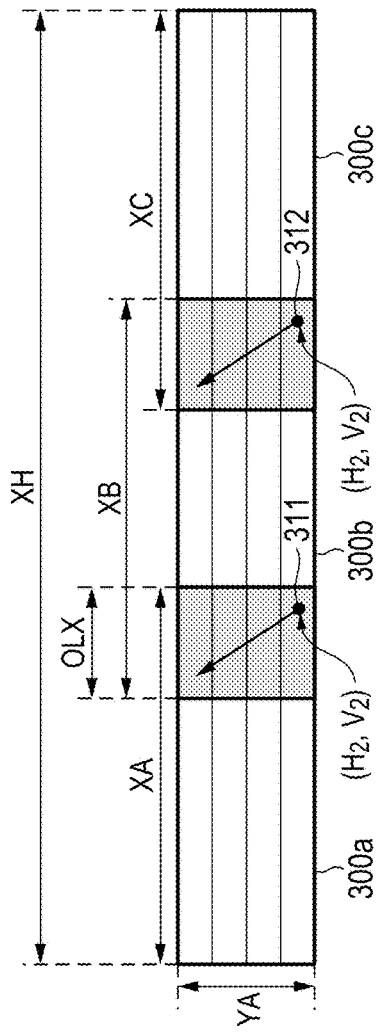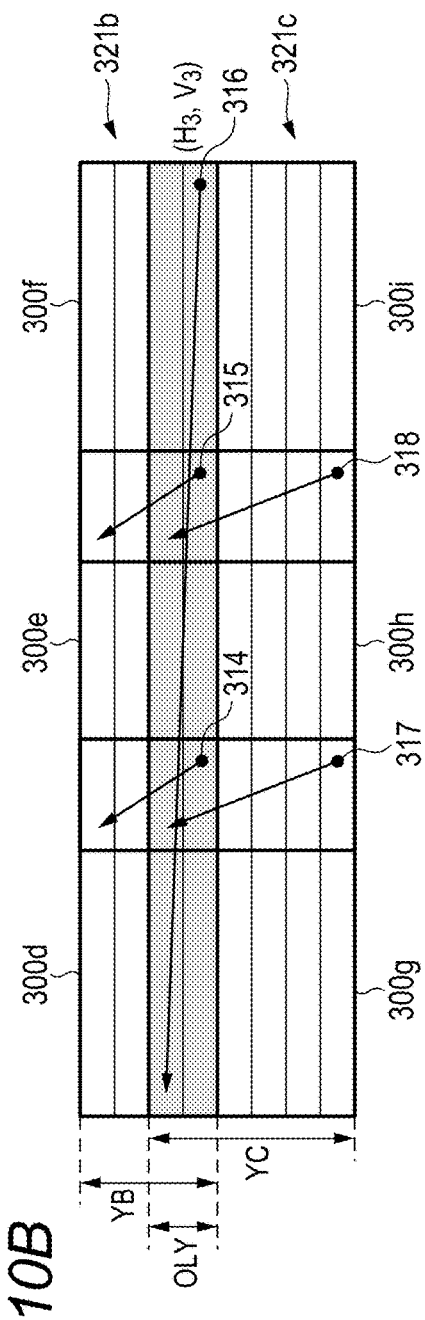

IMAGE PROCESSING APPARATUS AND IMAGE PROCESSING METHOD INCLUDING CONTROL WHETHER OR NOT TO PERMIT A READOUT REQUEST

BACKGROUND OF THE INVENTION

Field of the Invention

The present disclosure relates to an image processing apparatus and an image processing method.

Description of the Related Art

In recent years, the number of pixels of an image capturing element used for a digital camera or the like has increased up to several tens of millions. Due to such an increase in the number of pixels of an image capturing element, a longer time is required to write and read out image data acquired by the image capturing element to/from a memory. In order to reduce the time required to perform writing and readout to/from a memory, a proposed technique is to, immediately after writing image data obtained from an image capturing element to a memory, read out the image data from the memory to perform image processing or the like, for example. Specifically, a proposed control method is to manage addresses for readout and addresses under writing at a memory transfer controller and perform write operation and readout operation in parallel to reduce time from start of writing to completion of readout of image data. Such control is referred to as chase control.

Japanese Patent Application Laid-Open No. 2003-323333 discloses a technique of performing memory access so as not to cause readout operation to occur earlier than write operation. In Japanese Patent Application Laid-Open No. 2003-323333, a read counter that counts the number of times of readout and a write counter that counts the number of times of writing are used. In Japanese Patent Application Laid-Open No. 2003-323333, when the difference between the number of times of readout and the number of times of writing exceeds an upper limit setting value, the write operation is stopped. On the other hand, in Japanese Patent Application Laid-Open No. 2003-323333, when the difference between the number of times of readout and the number of times of writing becomes less than a lower limit setting value, the readout operation is stopped.

In the conventional art, however, chase control on a memory may not be properly performed when blocks used for write operation and blocks used for readout operation are different in the size or the like.

SUMMARY OF THE INVENTION

According to an aspect of an embodiment, there is provided an image processing apparatus including: a writing unit configured to write image data to a memory, wherein a plurality of first blocks are included in one frame of image data written by the writing unit to the memory; a reading unit configured to output a readout request for image data written by the writing unit to the memory and reads out the image data from the memory in response to the readout request being permitted, wherein, while image data of one frame is being written to the memory by the writing unit, the reading unit outputs a readout request for the image data of one frame written in the memory, and wherein a plurality of second blocks each having a different size from each of the first blocks are included in one frame of image data read out by the reading unit from the memory; a first acquisition unit configured to, in response to writing of a pixel at a predetermined position of the plurality of first block included in the one frame of image data being performed to the memory by the writing unit, acquire write coordinates corresponding to the position of the pixel up to which the writing is completed; a second acquisition unit configured to acquire readout coordinates corresponding to the position of the second block where readout is to be performed of the plurality of second blocks included in the image data written in the memory; and a controller configured to control whether or not to permit the readout request from the reading unit based on a positional relationship between the write coordinates acquired by the first acquisition unit and the readout coordinates acquired by the second acquisition unit, wherein the controller performs control so as not to permit the readout request from the reading unit if the positional relationship between the write coordinates and the readout coordinates does not satisfy a predetermined condition.

According to another aspect of an embodiment, there is provided an image processing method including writing image data to a memory, wherein a plurality of first blocks are included in one frame of image data written to the memory; outputting a readout request for image data written in the memory and reading out the image data from the memory in response to the readout request being permitted, wherein, while image data of one frame is being written to the memory, a readout request for the image data of one frame written in the memory is output, and wherein a plurality of second blocks each having a different size from each of the first blocks are included in one frame of image data read out from the memory; in response to writing of a pixel at a predetermined position of the plurality of first block included in the one frame of image data being performed to the memory, acquiring write coordinates corresponding to the position of the pixel up to which the writing is completed; acquiring readout coordinates corresponding to the position of the second block where readout is to be performed of the plurality of second blocks included in the image data written in the memory; and controlling whether or not to permit the readout request based on a positional relationship between the write coordinates and the readout coordinates, wherein control is performed so as not to permit the readout request if the positional relationship between the write coordinates and the readout coordinates does not satisfy a predetermined condition.

Further features of the present invention will become apparent from the following description of exemplary embodiments with reference to the attached drawings.

BRIEF DESCRIPTION OF THE DRAWINGS

FIG. 10A and FIG. 10B are diagrams conceptually illustrating jumps of access coordinates when access reaches the end of a divided block.

DESCRIPTION OF THE EMBODIMENTS

Figure 1:
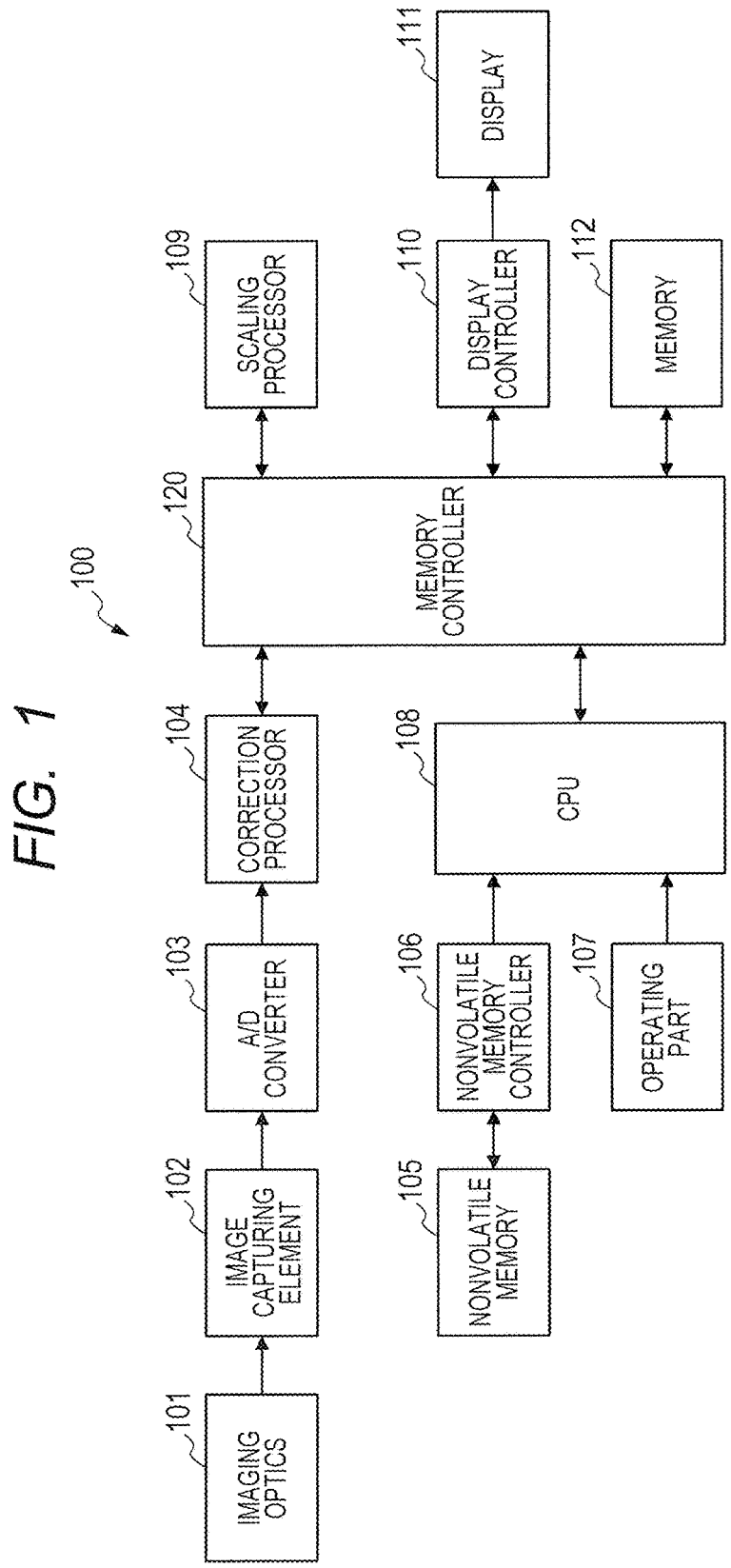
FIG. 1 is a block diagram illustrating an image processing apparatus according to an embodiment.

Preferred embodiments of the present invention will now be described in detail in accordance with the accompanying drawings.

Note that the present invention is not limited to the following embodiments and can be properly modified within the scope not departing from its spirit. Further, in the drawings described below, those having the same function are labeled with the same reference numerals and the description thereof may be omitted or simplified.

Embodiment

An image processing apparatus and an image processing method according to one embodiment will be described by using the drawings. FIG. 1 is a block diagram illustrating an image processing apparatus 100 according to the present embodiment. In the present embodiment, while a case where the image processing apparatus 100 is an imaging apparatus having an image capturing element, more specifically, a case where the image processing apparatus 100 is a digital camera will be exemplified, the embodiment is not limited thereto.

As illustrated in FIG. 1, imaging optics (imaging optics part) 101 is arranged before an image capturing element 102. The imaging optics 101 have a lens, a diaphragm, or the like. In an image capturing, the imaging optics 101 performs focus adjustment, exposure adjustment, or the like to capture an optical image on the image capturing element 102. The image capturing element (image capturing unit, image capturing means) 102 has a photoelectric conversion function that converts an optical image captured by the imaging optics 101 into an electrical signal (an analog image signal). That is, photoelectric conversion portions (photoelectric conversion devices) are arranged in a matrix on a receiving surface (not depicted) of the image capturing element 102. As the image capturing element 102, a CCD image sensor, a CMOS image sensor, or the like may be used, for example. The image capturing element 102 outputs motion image data whose one frame corresponds to 1920 horizontal pixels by 1080 vertical pixels and 60 frames per second (fps), for example. An A/D convertor 103 converts an analog image signal from the image capturing element 102 into a digital image signal.

A central processing unit (CPU) 108 is responsible for control of the entire image processing apparatus 100, instructs respective functional blocks (respective processors) to operate, and executes various types of control or processes. In a memory 112, data such as a static image, a motion image, a voice, and the like are stored. Further, parameter values used in operating the CPU (a controller, a processor) 108, a program executed by the image processing apparatus 100, or the like can be stored in the memory 112. The memory 112 has a sufficient storage capacity for storing the above. Further, the memory 112 is also used to temporarily store image data or the like that is under processing. As the memory 112, a dynamic random access memory (DRAM) is used, for example.

The memory controller 120 writes data to the memory 112 and reads out data from the memory 112 in response to instruction from the CPU 108. The nonvolatile memory controller 106 writes data to the nonvolatile memory 105 and reads out data from the nonvolatile memory 105 in response to an instruction from the CPU 108. The nonvolatile memory 105 is electrically erasable and recordable and may be, for example, an electrically erasable programmable read only memory (EEPROM) or the like. In the nonvolatile memory 105, parameter values, programs, and the like used in operating the CPU 108 are stored. The CPU 108 performs control to a correction processor 104, a scaling processor 109, a memory controller 120, a nonvolatile memory controller 106, a display controller 110, an operating part 107, and the image capturing element 102. Various processes performed by the image processing apparatus 100 are realized by the CPU 108 executing programs recorded in the nonvolatile memory 105 or the like.

The correction processor 104 performs image correction, black level correction, shading correction, defect correction, magnification color aberration correction, or the like on image data output from the A/D convertor 103. The memory controller 120 writes, to the memory 112, image data on which the correction process has been performed by the correction processor 104. Further, the memory controller 120 reads out, from the memory 112, image data that have been written to the memory 112 and transfers the read out data to the scaling processor 109, for example. The scaling processor 109 performs a resize process such as scaling, a compression and expansion process, a format conversion process, a development process, distortion correction, or the like on image data. The memory controller 120 writes image data processed by the scaling processor 109 to the memory 112. Further, the image data written to the memory 112 is read out by the memory controller 120 and properly transferred to respective functional blocks.

The correction processor 104 and/or the scaling processor 109 has a memory (not depicted) for storing image data to perform the process as described above. In order to reduce the memory capacity, the correction processor 104 and/or the scaling processor 109 performs the process described above in a unit of each of divided blocks 300a to 300i (see FIG. 3) defined by dividing one frame of image data in both the horizontal direction and the vertical direction. Thus, in the present embodiment, writing and readout of image data to/from the memory 112 are performed in a unit of each of the divided blocks 300a to 300i. Note that the divided blocks 300a to 300i will be described later in detail. Moreover, in order to reduce a delay in the process, the present embodiment performs chase control to sequentially read out image data of a portion where writing of image data is completed. By the way, when chase control is performed in a unit of each of the divided blocks 300a to 300i, readout operation from the divided blocks 300a to 300i cannot be performed unless writing of image data to the divided blocks 300a to 300i to be read out is fully completed. Thus, in the present embodiment, in order to reduce a delay of the process, chase control is performed in a unit of a line (block) 320 (see FIG. 3) that is a smaller unit and a plurality of the units are included in each of the divided blocks 300a to 300i. Therefore, in the present embodiment, image data are sequentially read out from the line (block) 320 in which writing operation is completed of the lines (blocks) 320 included in the divided block. Such chase control is performed by the memory controller 120 and the like. Note that each of the lines (blocks) 320 included in the divided blocks 300a to 300i may be referred to as a divided line, because each divided line has the same size as the size in the horizontal direction of the divided blocks 300a to 300i.

The display 111 is controlled by the display controller 110 to display various image data or the like. As the display 111, a liquid crystal monitor or the like may be used, for example. The operating part 107 includes switches, buttons, and the like operated by a user and is used for operation of ON/OFF of power supply, operation of ON/OFF of a shutter, or the like.

Figure 2:
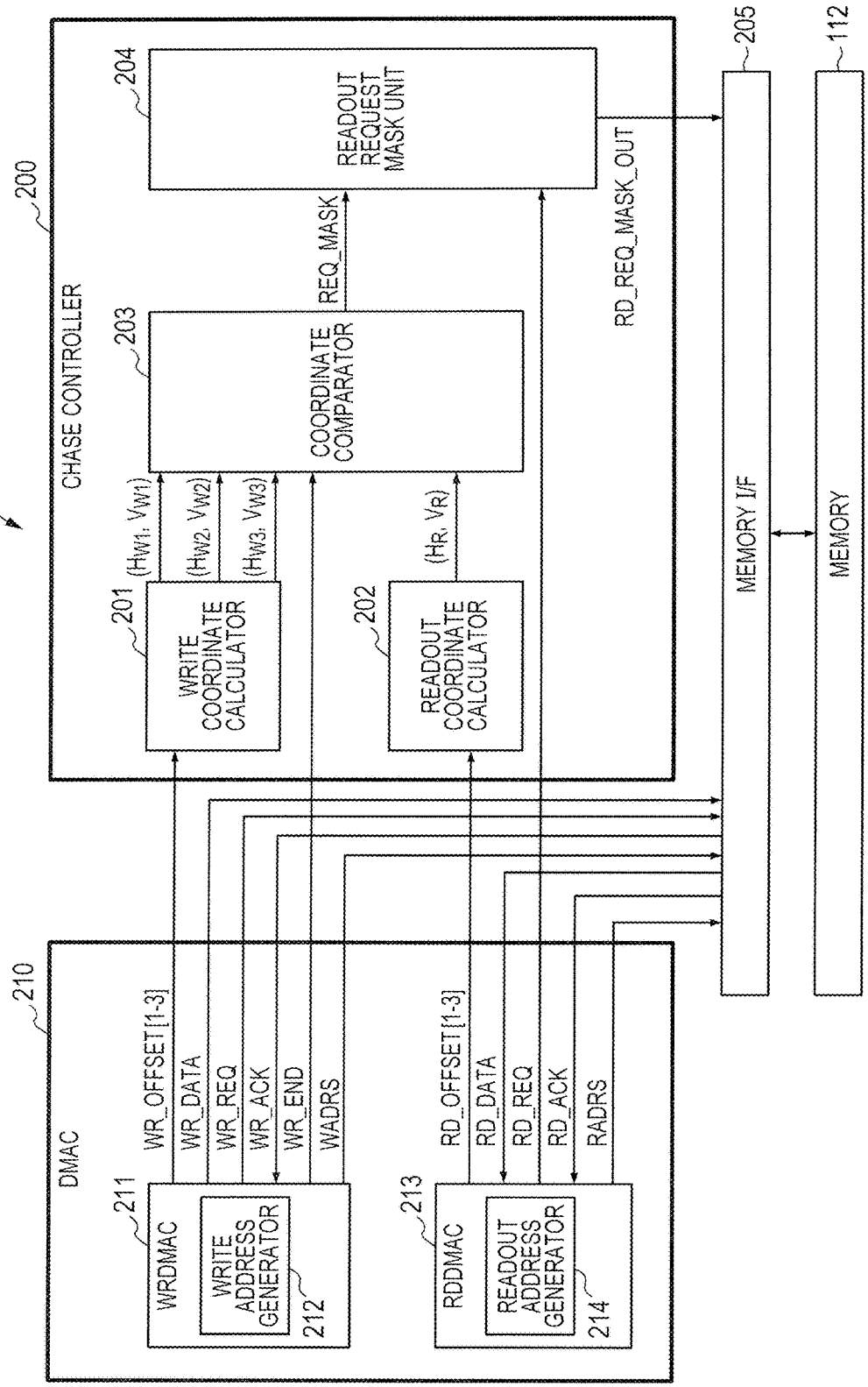
FIG. 2 is a block diagram illustrating a memory controller.

FIG. 2 is a block diagram illustrating the memory controller 120. The memory controller 120 has a direct memory access controller (DMAC) 210 and a chase controller 200. The DMAC 210 has a write direct memory access controller (WRDMAC) 211 that is a direct memory access controller for write operation. Further, the DMAC 210 has a read direct memory access controller (RDDMAC) 213 that is a direct memory access controller for readout operation. The memory interface (I/F) 205 controls the memory 112 according to control signals from the WRDMAC 211 and the RDDMAC 213. The chase controller 200 calculates write coordinates and readout coordinates described later based on offset signals from the WRDMAC 211 and the RDDMAC 213, and then properly masks a readout request signal RD_REQ from the RDDMAC 213 based on a comparison result of write coordinates and readout coordinates. Chase control is performed in which the RDDMAC 213 sequentially reads out image data of a portion where writing of image data has been completed by the WRDMAC 211. Such chase control is managed by the chase controller 200.

The WRDMAC 211 has a write address generator 212 that generates a memory address (an access address) in writing data to the memory 112, that is, a write address (a write address value) WADRS. The write address generator 212 may manage or control a data transfer length or the like. The RRDMAC 213 has a readout address generator 214 that generates a memory address in reading out data from the memory 112, that is, a readout address (a readout address value) RADRS. The readout address generator 214 may manage or control of a data transfer length or the like. The WRDMAC 211 has a function of incrementing a write address. Therefore, the WRDMAC 211 is able to sequentially store image data in a predetermined address space (address area) on the memory 112. Further, the RDDMAC 213 has a function of incrementing a readout address. Therefore, the RDDMAC 213 is able to sequentially read out image data stored in a predetermined address space on the memory 112. Further, WRDMAC 211 and the RDDMAC 213 are able to properly cause the access address to jump (an offset jump function) and able to sequentially perform write operation and readout operation of image data of the divided blocks 300a to 300i to/from the memory 112.

In such a way, the WRDMAC 211 may function as writing means that writes an image (image data) to the memory 112. Further, the RDDMAC 213 may function as readout means that reads out, from the memory 112, an image (image data) that has been written to the memory 112 by the WRDMAC 211.

Figure 7:
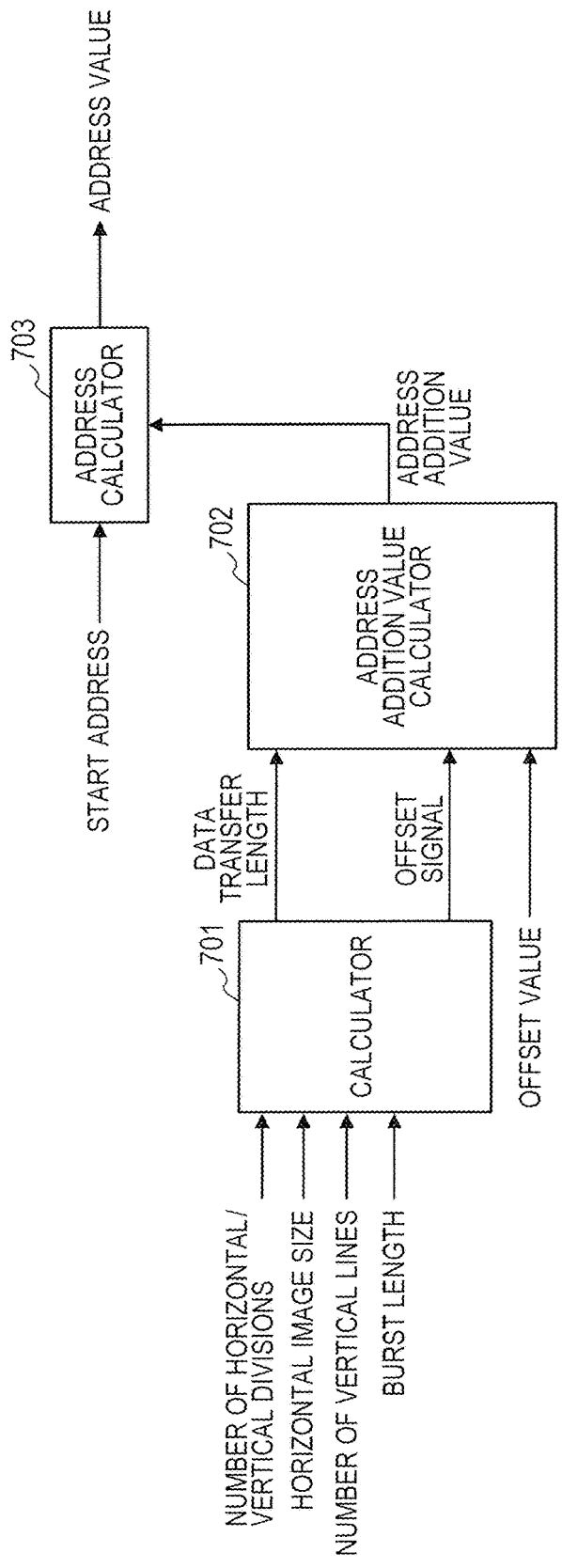
FIG. 7 is a block diagram illustrating a configuration of a write address generator and a readout address generator.

FIG. 7 is a block diagram illustrating a configuration of the write address generator 212 and a readout address generator 214. Since the write address generator 212 and the readout address generator 214 have the same configuration, the same drawing, that is, FIG. 7 will be used here to describe the write address generator 212 and the readout address generator 214.

The WRDMAC 211 and the RDDMAC 213 have an offset jump function that causes the access address to jump every time a certain amount of image data is transferred. For example, a jump of the access address may occur every time transfer of image data for one line 320 (see FIG. 3) is completed. Further, a jump of the access address may occur every time transfer of image data of one of the divide blocks 300a to 300i (see FIG. 3) is completed. Further, a jump of the access address occurs every time transfer of image data of one of the block lines 321a to 321c (see FIG. 3) is completed. In order to implement such an offset jump function, the CPU 108 applies the following settings to the WRDMAC 211 and the RDDMAC 213. That is, the CPU 108 sets a start address by inputting a start address value to an address counter provided to the WRDMAC 211 and the RDDMAC 213. Further, the CPU 108 inputs the numbers of horizontal and vertical divisions, that is, the number of divisions of an image in the horizontal direction and the number of divisions of the image in the vertical direction to a calculator 701 provided to the WRDMAC 211 and the RDDMAC 213. Note that, although the case of inputting the numbers of horizontal and vertical divisions is exemplified here, input information is not limited thereto. Some information indicating a form of division in the horizontal direction and a form of division in the vertical direction can be properly input. This allows for supporting a case where the division is in an uneven form, a case where respective divided blocks overlap with each other, or the like. Further, the CPU 108 inputs, to the calculator 701, a horizontal image size, that is, the number of pixels of an image in the horizontal direction and the number of vertical lines, that is, the number of pixels of an image in the vertical direction. Further, the CPU 108 inputs, to the calculator 701, a burst length, that is, the data length that can be successively accessed by one time of address designation in a request signal. Further, the CPU 108 inputs an offset value (an offset jump value) to an address addition value calculator 702 provided to the WRDMAC 211 and the RDDMAC 213. An offset value is to indicate an offset amount applied in an offset jump. There are multiple types of these offset values, and a proper offset value is selected in accordance with the position of an offset jump. Such an offset value is set by the CPU 108, for example.

The calculator 701 calculates a data transfer length based on the horizontal image size, the number of horizontal divisions, the burst length, or the like and outputs the calculated data transfer length to the address addition value calculator 702. A data transfer length is the length of data transferred in one time of access to the memory 112, that is, a data amount transferred in one time of access to the memory 112. The calculator 701 generates an offset signal based on the data amount transferred in the access to the memory 112 and outputs the generated offset signal to the address addition value calculator 702. Specifically, in response to write operation reaching each of pixels 301 to 309 located at the end (the last) of each lines 320, a first write offset signal WR_OFFSET1 is generated, respectively. In response to readout operation reaching each of the pixels 301 to 309 located at the end of each line 320, a first readout offset signal RD_OFFSET1 is generated, respectively. In response to write operation reaching each of the pixels 311, 312, 314, 315, 317, and 318 located at the end of each of the divided blocks 300a, 300b, 300d, 300e, 300g, and 300h, a second write offset signal WR_OFFSET2 is generated, respectively. In response to readout operation reaching each of the pixels 311, 312, 314, 315, 317, and 318 located at the end of each of the divided blocks 300a, 300b, 300d, 300e, 300g, and 300h, a second readout offset signal RD_OFFSET2 is generated, respectively. In response to write operation reaching each of the pixels 313 and 316 located at the end of each of the block lines 321a and 321b, a third write offset signal WR_OFFSET3 is generated, respectively. In response to readout operation reaching each of the pixels 313 and 316 located at the end of each of the block lines 321a and 321b, a third readout offset signal RD_OFFSET3 is generated, respectively.

The address addition value calculator 702 calculates an address addition value based on the data transfer length output from the calculator 701 and outputs the calculated address addition value to the address calculator 703. When receiving an offset signal from the calculator 701, the address addition value calculator 702 adds a proper offset value to the data transfer length received from the calculator 701. The address addition value calculator 702 is able to know which divided block is under write operation or readout operation based on the offset signal and therefore can select a proper offset value. The address addition value calculator 702 then outputs the value obtained by addition to the address calculator 703 as an address addition value.

When starting access to the memory 112, the address calculator 703 outputs an address value based on the start address set by the CPU 108. After access to the memory 112 is started, the address calculator 703 adds an address addition value output from the address addition value calculator 702 to the current address value and outputs the calculated address value. When an offset signal is issued from the calculator 701, the address calculation value output from the address addition value calculator 702 is offset by an offset value corresponding to that offset signal. Therefore, when an offset signal is issued from the calculator 701, an offset jump in accordance with the offset value corresponding to that offset signal will be performed.

Figure 3:
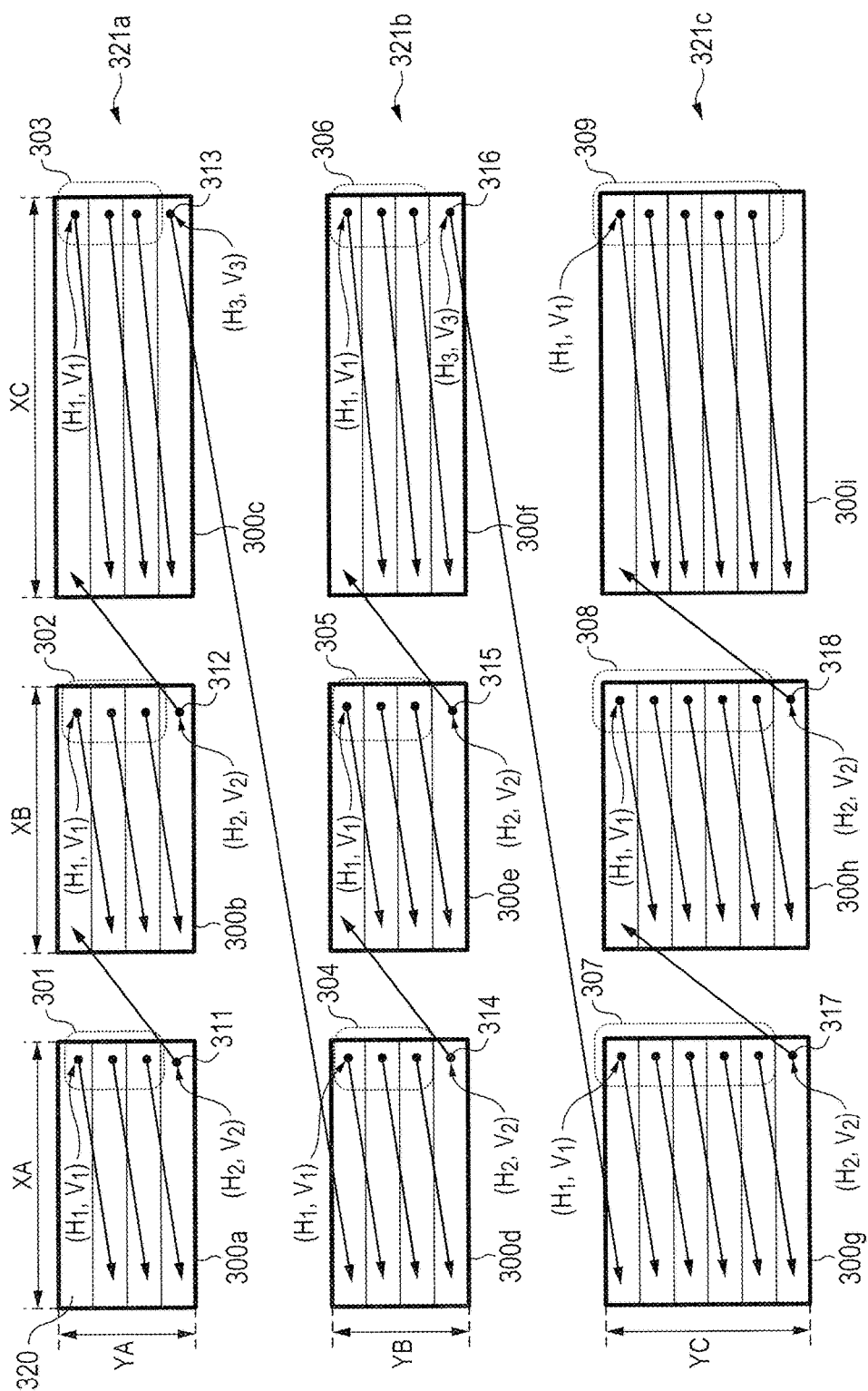
FIG. 3 is a diagram conceptually illustrating the order of write access and readout access.

FIG. 3 is a diagram conceptually illustrating the order of write access and readout access. FIG. 3 conceptually illustrates a virtual address space in the memory 112 such that it corresponds to an image. As illustrated in FIG. 3, rectangular divided blocks 300a to 300i are defined by dividing one frame of image data into three in the horizontal direction and the vertical direction, respectively. These divided blocks 300a to 300i are successively accessed in a two-dimensional manner. Note that, in the present specification, the reference numerals 300a to 300i will be used when describing an individual divided block, and the reference numeral 300 will be used when generally describing a divided block.

Each of the divided blocks 300 includes a plurality of lines 320. Further, a block line 321a is formed of a plurality of divided blocks 300a to 300c, a block line 321b is formed of a plurality of divided blocks 300d to 300f, and a block line 321c is formed of a plurality of divided blocks 300g to 300i. Here, the reference numerals 321a to 321c will be used when describing an individual block line, and the reference numeral 321 will be used when generally describing a block line.

The number of pixels (the size) in the horizontal direction of the divided blocks 300a, 300d, and 300g is denoted as XA, the number of pixels in the horizontal direction of the divided blocks 300b, 300e, and 300h is denoted as XB, and the number of pixels in the horizontal direction of the divided blocks 300c, 300f, and 300i is denoted as XC. The number of lines (the number of pixels) in the vertical direction of the divided blocks 300a to 300c is denoted as YA, the number of lines in the vertical direction of the divided blocks 300d to 300f is denoted as YB, and the number of lines in the vertical direction of the divided blocks 300g to 300i is denoted as YC. Note that, although it is assumed here as YA=4, YB=4, and YC=6 to simplify the description, the number of lines in the vertical direction is far larger than those values in the actual implementation. Further, the number of pixels in the horizontal direction of a single image is defined as XH (=XA+XB+XC). The numbers of pixels XA to XC, the numbers of lines YA to YC, the offset value, and the like are input in advance from the CPU 108 to the calculator 701 and/or the address addition value calculator 702 provided to the DMAC 210 as described above. Further, these values are pre-stored in a resister (not depicted) provided to the calculator 710 and/or the address addition value calculator 702. Each arrow in FIG. 3 conceptually illustrates a jump of coordinates, that is, an address jump. Note that an address to which data of the pixel located at the left-upper end of one frame of an image is written is a head address of an address area to which the image data is written. The first line to the last line of the image are then sequentially written to successive addresses. Data of a pixel located at the head of the n+1-th line of the image is written to an address next to the address to which data of the pixel located at the end of the n-th line of the image is written. An address to which data of the pixel located at the right-under end of the image is written will be the last address in the address area to which the image data is written.

As described above, in the present embodiment, write operation and readout operation are performed in a unit of the divided block 300. For example, first, the image data of the divided block 300a located at the left-upper in FIG. 3 is written to the memory 112. After the completion of writing of image data of the divided block 300a, writing of image data of the divided block 300b located in the right side of the divided block 300a is performed. After the completion of writing of image data of the divided block 300b, writing of image data of the divided block 300c located in the right side of the divided block 300b is performed. In such a way, image data of the divided blocks 300a to 300c located on the first block line 321a are sequentially written to the memory 112 from the left side to the right side. After the completion of writing of image data of the divided blocks 300a to 300c located on the first block line 321a, writing of image data of the divided blocks 300d to 300f located on the second block line 321b is sequentially performed. After the completion of writing of image data of the divided blocks 300d to 300f located on the second block line 321b, writing of image data of the divided blocks 300g to 300i located on the third block line 321c is sequentially performed. In this way, image data of all the divided blocks 300a to 300i are sequentially written to the memory 112. Note that, although write access is exemplified here, readout access will be performed in a similar manner.

The order in write access will be more specifically described below. First, image data of the divided block 300a are written to the memory 112 as described below. That is, according to address values issued by the write address generator 212, image data of the first line 320 of the divided block 300a are written to the memory 112. The head coordinates of the first line 320 of the divided block 300a are (1, 1), and the last coordinates ($H_1$, $V_1$) of the first line 320 of the divided block 300a are (XA, 1).

After the completion of writing of image data of the first line 320 of the divided block 300a, writing of image data of the second line 320 of the divided block 300a is performed. The head coordinates of the second line 320 of the divided block 300a are (1, 2). The memory address corresponding to the coordinates (1, 2) is not a memory address next to the memory address corresponding to the coordinates (XA, 1). Therefore, when writing of image data of the first line 320 transfers to writing of image data of the second line 320, a jump of the access address is performed. Specifically, in response to write operation reaching the last coordinates (XA, 1) of the first line 320 of the divided block 300a, addition of an offset value to an address value is performed by the address addition value calculator 702 of the write address generator 212. That is, a jump of the access address is performed not only by adding a value corresponding to a data transfer length to the current address value, but also by adding the offset value to the current address value. The offset value added here is (XH−XA).

Then, writing of image data of each of the plurality of lines 320 located within the divided block 300a is sequentially performed. Every time writing operation reaches the pixel 301 at the last coordinates ($H_1$, $V_1$) of the respective lines 320 except the last line 320 of the plurality of lines 320 located within the divided block 300a, an offset value is added to an address value. Thereby, while access addresses are sequentially jumped, writing of image data of each of the plurality of lines 320 located within the divided block 300a is sequentially performed. In such a way, image data of the divided block 300a are written to the memory 112.

After the completion of writing of image data of the divided block 300a to the memory 112, writing of image data of the divided block 300b located in the right side of the divided block 300a is performed. Coordinates ($H_2$, $V_2$) of the last pixel 311 of the YA-th line 320 that is the last line 320 of the divided block 300a, that is, the coordinates ($H_2$, $V_2$) of the last pixel 311 of the divided block 300a are (XA, YA). On the other hand, the head coordinates of the first line 320 of the divided block 300b, that is, the head coordinates of the divided block 300b are (XA+1, 1). The memory address corresponding to the coordinates (XA+1, 1) is not a memory address next to the memory address corresponding to the coordinates (XA, YA). Therefore, when writing of image data of the first divided block 300a transfers to writing of image data of the second divided block 300b, a jump of the access address is performed. Specifically, in response to write operation reaching the last coordinates (XA, YA) of the first divided block 300a, addition of an offset value to an address value is performed. That is, a jump of the access address is performed not only by adding a value corresponding to a data transfer length to the address value, but also by adding the offset value to the address value. The offset value added here is (−XH×(YA−1)). Since the offset value is a negative value, the memory address returns to the memory address corresponding to the coordinates (XA+1, 1) from the memory address corresponding to the coordinates (XA, YA). In such a way, the access address jumps, and writing of image data of the first line 320 of the divided block 300b is performed. The head coordinates of the first line 320 of the divided block 300b are (XA+1, 1), and the last coordinates of the first line 320 of the divided block 300b are (XA+XB, 1). After the completion of writing of image data of the first line 320 of the divided block 300b, writing of image data of the second line 320 of the divided block 300b is performed. The head coordinates of the second line 320 of the divided block 300b are (XA+1, 2). Therefore, when writing of image data of the first line 320 transfers to writing of image data of the second line 320, a jump of the access address is performed. That is, in response to write operation reaching the last coordinates (XA+XB, 1) of the first line 320 of the divided block 300b, addition of an offset value to an address value is performed. The offset value added here is (XH−XB). Then, writing of image data of each of the plurality of lines 320 located within the divided block 300b is sequentially performed. Every time writing operation reaches the pixel 302 at the last coordinates ($H_1$, $V_1$) of the respective lines 320 except the last line 320 of the plurality of lines 320 located within the divided block 300b, an offset value is added to an address value. Thereby, while access addresses are sequentially jumped, writing of image data of each of the plurality of lines 320 located within the divided block 300b is sequentially performed. In such a way, image data of the divided block 300b are written to the memory 112.

After the completion of writing of image data of the divided block 300b to the memory 112, writing of image data of the divided block 300c located in the right side of the divided block 300b is performed. The last coordinates of the divided block 300b are (XA+XB, YA). On the other hand, the head coordinates of the first line 320 of the divided block 300c are (XA+XB+1, 1). The memory address corresponding to the coordinates (XA+XB+1, 1) is not a memory address next to the memory address corresponding to the coordinates (XA+XB, YA). Therefore, when writing of image data of the divided block 300b transfers to writing of image data of the divided block 300c, a jump of the access address is performed. Specifically, in response to write operation reaching the last coordinates (XA+XB, YA) of the divided block 300b, addition of an offset value to an address value is performed. That is, a jump of the access address is performed not only by adding a value corresponding to a data transfer length to the address value, but also by adding the offset value to the address value. The offset value added here is (−XH×(YA−1)). Since the offset value is a negative value, the memory address returns to the memory address corresponding to the coordinates (XA+XB+1, 1) from the memory address corresponding to the coordinates (XA+XB, YA). In such a way, the access address jumps, and writing of image data on the first line 320 of the divided block 300c is performed. The head coordinates of the first line 320 of the divided block 300c are (XA+XB+1, 1), and the last coordinates of the first line 320 of the divided block 300c are (XA+XB+XC, 1). After the completion of writing of image data of the first line 320 of the divided block 300c, writing of image data of the second line 320 of the divided block 300c is performed. The head coordinates of the second line 320 of the divided block 300c are (XA+XB+1, 2). Therefore, when writing of image data of the first line 320 transfers to writing of image data of the second line 320, a jump of the access address is performed. That is, in response to write operation reaching the last coordinates (XA+XB+XC, 1) of the divided block 300c, addition of an offset value to an address value is performed. The offset value added here is (XH−XC). Then, writing of image data of each of the plurality of lines 320 located within the divided block 300c is sequentially performed. Every time writing operation reaches the last pixel 303 of the respective lines 320 except the last line 320 of the plurality of lines 320 located within the divided block 300c, an offset value is added to an address value. Thereby, while access addresses are sequentially jumped, writing of image data of each of the plurality of lines 320 located within the divided block 300c is sequentially performed. In such a way, image data of the divided block 300c are written to the memory 112.

After the completion of writing of image data of the divided block 300c to the memory 112, writing of image data of the divided block 300d located under the divided block 300a is performed. The last coordinates of the divided block 300c are (XA+XB+XC, YA). On the other hand, the head coordinates of the first line 320 of the divided block 300d are (1, YA+1). The memory address corresponding to the coordinates (1, YA+1) is a memory address next to the memory address corresponding to the coordinates (XA+XB+XC, YA). It is therefore unnecessary to add an offset value to an address value in this case. Thus, when writing of image data of the divided block 300c transfers to writing of image data of the divided block 300d, no addition of an offset value to an address value is performed. In other words, an offset value=0 is added. Then, writing of image data of each of the plurality of lines 320 located within the divided block 300d is sequentially performed. Every time writing operation reaches the pixel 304 at the last coordinates ($H_1$, $V_1$) of the respective lines 320 except the last line 320 of the plurality of lines 320 located within the divided block 300d, an offset value, that is, (XH−XA) is added to an address value. Thereby, while access addresses are sequentially jumped, writing of image data of each of the plurality of lines 320 located within the divided block 300d is sequentially performed. In such a way, image data of the divided block 300d are written to the memory 112.

After the completion of writing of image data of the divided block 300d to the memory 112, writing of image data of the divided block 300e located in the right side of the divided block 300d is performed. When writing of image data of the divided block 300d transfers to writing of image data of the divided block 300e, addition of an offset value to an address value is performed in the same manner as described above. The offset value added here is (−XH×(YB−1)). In such a way, writing of image data of the divided block 300d transfers to writing of image data of the divided block 300e. Then, writing of image data of each of the plurality of lines 320 located within the divided block 300e is sequentially performed. Every time writing operation reaches the pixel 305 at the last coordinates ($H_1$, $V_1$) of the respective lines 320 except the last line 320 of the plurality of lines 320 located within the divided block 300e, an offset value, that is, (XH−XB) is added to an address value. Thereby, while access addresses are sequentially jumped, writing of image data of each of the plurality of lines 320 located within the divided block 300e is sequentially performed. In such a way, image data of the divided block 300e are written to the memory 112.

After the completion of writing of image data of the divided block 300e to the memory 112, writing of image data of the divided block 300f located in the right side of the divided block 300e is performed. When writing of image data of the divided block 300e transfers to writing of image data of the divided block 300f, addition of an offset value to an address value is performed in the same manner as described above. The offset value added here is (−XH×(YB−1)). In such a way, writing of image data of the divided block 300e transfers to writing of image data of the divided block 300f. Then, writing of image data of each of the plurality of lines 320 located within the divided block 300f is sequentially performed. Every time writing operation reaches the last pixel 306 of the respective lines 320 except the last line 320 of the plurality of lines 320 located within the divided block 300f, an offset value, that is, (XH−XC) is added to an address value. Thereby, while access addresses are sequentially jumped, writing of image data of each of the plurality of lines 320 located within the divided block 300f is sequentially performed. In such a way, image data of the divided block 300f are written to the memory 112.

After the completion of writing of image data of the divided block 300f to the memory 112, writing of image data of the divided block 300g located under the divided block 300d is performed. When writing of image data of the divided block 300f transfers to writing of image data of the divided block 300g, no addition of an offset value to an address value is performed. That is, writing of image data of the divided block 300f transfers to writing of image data of the divided block 300g by adding an address addition value corresponding to the data transfer length to an address value. Then, writing of image data on each of the plurality of lines 320 located within the divided block 300g is sequentially performed. Every time writing operation reaches the last pixel 307 of the respective lines 320 except the last line 320 of the plurality of lines 320 located within the divided block 300g, an offset value, that is, (XH−XA) is added to an address value. Thereby, while access addresses are sequentially jumped, writing of image data of each of the plurality of lines 320 located within the divided block 300g is sequentially performed. In such a way, image data of the divided block 300g are written to the memory 112.

After the completion of writing of image data of the divided block 300g to the memory 112, writing of image data of the divided block 300h located in the right side of the divided block 300g is performed. When writing of image data of the divided block 300g transfers to writing of image data of the second divided block 300h, addition of an offset value to an address value is performed in the same manner as described above. The offset value added here is (−XH×(YC−1)). In such a way, writing of image data of the divided block 300g transfers to writing of image data of the divided block 300h. Then, writing of image data of each of the plurality of lines 320 located within the divided block 300h is sequentially performed. Every time writing operation reaches the last pixel 308 of the respective lines 320 except the last line 320 of the plurality of lines 320 located within the divided block 300h, an offset value, that is, (XH−XB) is added to an address value. Thereby, while access addresses are sequentially jumped, writing of image data of each of the plurality of lines 320 located within the divided block 300h is sequentially performed. In such a way, image data of the divided block 300h are written to the memory 112.

After the completion of writing of image data of the divided block 300h to the memory 112, writing of image data of the divided block 300i located in the right side of the divided block 300h is performed. When writing of image data of the divided block 300h transfers to writing of image data of the divided block 300i, addition of an offset value to an address value is performed in the same manner as described above. The offset value added here is (−XH×(YC−1)). In such a way, writing of image data of the divided block 300h transfers to writing of image data of the divided block 300i. Then, writing of image data of each of the plurality of lines 320 located within the divided block 300i is sequentially performed. Every time writing operation reaches the last pixel 309 of the respective lines 320 except the last line 320 of the plurality of lines 320 located within the divided block 300i, an offset value, that is, (XH−XC) is added to an address value. Thereby, while access addresses are sequentially jumped, writing of image data of each of the plurality of lines 320 located within the divided block 300i is sequentially performed. In such a way, image data of the divided block 300i are written to the memory 112.

With the process as described above, the images divided into nine divided blocks 300 are sequentially written to the memory 112.

Note that, although write operation is exemplified here, readout operation may be performed in a similar manner. The operation of the readout address generator 214 when images divided into a plurality of divided blocks 300 are read out to the memory 112 is substantially the same as the above-described operation of the write address generator 212 when an image is divided into a plurality of divided blocks 300 to write the divided images to the memory 112. Therefore, detailed description of readout operation will be omitted here.

The image processing apparatus according to the present embodiment is to perform chase control in a unit of the block (line) 320 included in the divided block 300 as described above. Therefore, when readout of image data of a certain line 320 is enabled, readout of image data of the certain line 320 is properly performed even in a state where writing of some divided block 300 used for write operation is not fully completed. The WRDMAC 211 writes a plurality of lines (blocks) 320 included in one frame of an image to the memory 112 in the predetermined order as described above. Further, the RDDMAC 213 reads out a plurality of lines (blocks) 320 included in one frame of an image from the memory 112 in the predetermined order as described above.

Next, signals input and output among the DMAC 210, the memory I/F 205, and the chase controller 200 will be described by using FIG. 2. As illustrated in FIG. 2, a write request signal WR_REQ output from the WRDMAC 211 provided to the DMAC 210 is input to the memory I/F 205. The write request signal WR_REQ is used to request the memory I/F 205 for writing of image data to the memory 112. The write request signal WR_REQ is issued when the WRDMAC 211 receives image data of one line 320 from the correction processor 104, for example, and is enabled to transmit image data of that one line 320 to the memory I/F 205, for example. An acknowledge signal WR_ACK output in a pulse-like manner from the memory I/F 205 is input to the WRDMAC 211. The acknowledge signal WR_ACK is output when the memory I/F 205 receives the write request signal WR_REQ from the WRDMAC 211 and the memory I/F 205 is enabled to receive write data WR_DATA, for example. After receiving the acknowledge signal WR_ACK, the WRDMAC 211 writes the write data WR_DATA, which is image data of one line 320, to the memory 112 via the memory I/F 205, for example. After receiving the acknowledge signal WR_ACK, the write address generator 212 increments an address value and, if necessary, adds various offset values to the address value for preparing for writing of image data of the next line 320.

A readout request signal RD_REQ output from the RDDMAC 213 provided to the DMAC 210 is input to a readout request mask unit 204 provided to the chase controller 200. The readout request signal RD_REQ is used to request the memory I/F 205 for readout of image data from the memory 112. The readout request signal RD_REQ is input to the memory I/F 205 as a readout request signal RD_REQ_MASK_OUT via the readout request mask unit 204. The readout request signal RD_REQ is issued when the RRDMAC 213 is enabled to receive image data of one line 320, for example. An acknowledge signal RD_ACK output in a pulse-like manner from the memory I/F 205 is input to the RDDMAC 213. The acknowledge signal RD_ACK is output when the memory I/F 205 receives the readout request signal RD_REQ_MASK_OUT and the memory I/F 205 is enabled to transmit readout data RD_DATA, for example. After receiving acknowledge signal RD_ACK, the RDDMAC 213 reads out the readout data RD_DATA, which is image data of one line 320 from the memory 112 via the memory I/F 205, for example. After receiving the acknowledge signal RD_ACK, the readout address generator 214 increments an address value and, if necessary, adds various offset values to the address value for preparing for readout of image data of the next line 320.

As described above, after receiving the acknowledge signal WR_ACK, the write address generator 212 increments an address value and, if necessary, adds various offset values to the address value for preparing for writing of image data of the next line 320. When offset value is added to the address value, write offset signals WR_OFFSET1 to WR_OFFSET3 are issued by the WRDMAC 211. The write offset signals WR_OFFSET1 to WR_OFFSET3 issued by the WRDMAC 211 are input to a write coordinate calculator 201 provided to the chase controller 200. Based on the write offset signals WR_OFFSET1 to WR_OFFSET3, the write coordinate calculator 201 calculates first to third write coordinates $(H_{W1}, V_{W1})$ to $(H_{W3}, V_{W3})$, respectively, which indicate the position up to which the write operation reached. The first write coordinates $(H_{W1}, V_{W1})$ are updated when write operation reaches each of the last pixels 301 to 309 of the lines 320 except the last line 320 of the plurality of lines 320 included in the divided block 300. The first write coordinates $(H_{W1}, V_{W1})$ indicate the coordinates of each of the last pixels 301 to 309 of the lines 320 except the last line 320 of the plurality of lines 320 where write operation has been completed. The second write coordinates $(H_{W2}, V_{W2})$ are updated when write operation reaches each of the last pixels 311, 312, 314, 315, 317, and 318 of the divided blocks 300 except the end of the plurality of divided blocks 300 included in the block lines 321. The second write coordinates $(H_{W2}, V_{W2})$ indicate the coordinates of the last pixels 311, 312, 314, 315, 317, and 318 of the last divided block 300 of the divided blocks 300 where write operation has been completed. The third write coordinates $(H_{W3}, V_{W3})$ are updated when write operation reaches each of the last pixels 313 and 316 of the block lines 321 except the last block line 321 of the plurality of block lines 321. The third write coordinates $(H_{W3}, V_{W3})$ indicate the coordinates of each of the last pixels 313 and 316 of the block line 321 where write operation has been completed. Note that respective write offset signals WR_OFFSET1 to WR_OFFSET3 issued from the WRDMAC 211 are output to be High level synchronized with the write request signal WR_REQ.

In such a way, the write coordinate calculator 201 may function as write coordinate calculation means that, based on the write offset signal, calculates write coordinates indicating the position of the line 320 up to which writing has been completed of the plurality of blocks (lines) 320 included in an image. Further, the readout coordinate calculator 202 may function as readout coordinate calculation means that, based on the readout offset signal, calculates readout coordinates indicating the position of the block where readout is to be performed of the plurality of blocks (lines) 320 included in an image. Further, the write coordinate calculator 201 updates write coordinates every time writing of the plurality of blocks (lines) 320 included in one frame of an image is completed.

As described above, after receiving the acknowledge signal RD_ACK, the readout address generator 214 increments an address value and, if necessary, adds various offset values to the address value for preparing for readout of image data of the next line 320. When offset value is added to the address value, readout offset signals RD_OFFSET1 to RD_OFFSET3 are issued by the RDDMAC 213. The readout offset signals RD_OFFSET1 to RD_OFFSET3 issued by the RDDMAC 213 are also input to a readout coordinate calculator 202 provided to the chase controller 200. The readout coordinate calculator 202 then calculates readout coordinates $(H_R, V_R)$ indicating the coordinates of the last pixels of the line 320 to be read out when the readout request signal RD_REQ_MASK_OUT becomes High level. Based on the readout offset signals RD_OFFSET1 to RD_OFFSET3, the readout coordinate calculator 202 calculates the readout coordinates ($H_R$, $V_R$). The readout coordinate calculator 202 increases the value of $V_R$ by one every time receiving the readout offset signal RD_OFFSET1 issued in a readout operation of the lines 320 except the last line 320 of the plurality of lines 320 included in the divided blocks 300. On the other hand, when receiving the above readout offset signal RD_OFFSET1, the readout coordinate calculator 202 does not change the value of $H_R$. Further, each time of receiving the readout offset signal RD_OFFSET2 that is issued every time readout operation reaches the last pixels of the divided blocks 300 except the last divided block 300 of the block line 321, the readout coordinate calculator 202 operates as described below. That is, the readout coordinate calculator 202 decreases the value of $V_R$ by a value obtained by subtracting one from the number of lines 320 included in the current divided block 300. On the other hand, when receiving the above readout offset signal RD_OFFSET2, the readout coordinate calculator 202 increases the value of $H_R$ by an amount corresponding to the size (the number of pixels) in the horizontal direction of the next divided block 300 of the current divided block 300. Further, when receiving the readout offset signal RD_OFFSET3 that is issued every time readout operation reaches the last pixel of the block line 321, the readout coordinate calculator 202 increases the value of $V_R$ by one. On the other hand, when receiving the above readout offset signal RD_OFFSET3, the readout coordinate calculator 202 determines a value of $H_R$ as a value corresponding to the size (the number of pixels) in the horizontal direction of the head divided block 300 of the block line 321 next to the current block line 321. The readout coordinate calculator 202 updates the readout coordinates ($H_R$, $V_R$) when the request signal RD_REQ is issued from the RDDMAC 213 to the readout request mask unit 204.

The chase controller 200 has a coordinate comparator 203. The first to third write coordinates ($H_{W1}$, $V_{W1}$) to ($H_{W3}$, $V_{W3}$) calculated by the write coordinate calculator 201 are input to the coordinate comparator 203. Further, the readout coordinates ($H_R$, $V_R$) calculated by the readout coordinate calculator 202 are input to the coordinate comparator 203. The coordinate comparator 203 compares the write coordinates ($H_{W1}$, $V_{W1}$) to ($H_{W3}$, $V_{W3}$) for knowing the position of the lines 320 where write operation is completed with the readout coordinates ($H_R$, $V_R$) for knowing the position of the line 320 to be next read out. When any one of the following conditional expressions (1) to (3) is satisfied as a result of comparison of the write coordinates ($H_{W1}$, $V_{W1}$) to ($H_{W3}$, $V_{W3}$) with the readout coordinates ($H_R$, $V_R$), it is preferable to perform readout operation. Thus, when any one of the following conditional expressions (1) to (3) is satisfied, the coordinate comparator 203 causes a request mask signal REQ_MASK, which is output to the readout request mask unit 204, to be Low level. As described later, when the request mask signal REQ_MASK is Low level, the readout request signal RD_REQ issued from the RDDMAC 213 is not masked in the readout request mask unit 204, and thus readout operation is performed. On the other hand, when none of the following conditional expressions (1) to (3) is satisfied, no readout operation is performed. Thus, when none of the following conditional expressions (1) to (3) is satisfied, the coordinate comparator 203 causes the request mask signal REQ_MASK, which is output to the readout request mask unit 204, to be High level.

$$H_{W1} \geq H_R \text{ and } V_{W1} > V_R \quad (1)$$

$$H_{W2} \geq H_R \text{ and } V_{W2} > V_R \quad (2)$$

$$H_{W3} \geq H_R \text{ and } V_{W3} > V_R \quad (3)$$

Note that determination as to whether or not any one of the above conditions (1) to (3) is satisfied is performed at a timing of a rising edge of a clock signal CLK. In such a way, control of the request mask signal REQ_MASK is performed by the coordinate comparator 203.

When the request mask signal REQ_MASK is Low level, the readout request mask unit 204 causes the readout request signal RD_REQ_MASK_OUT, which is output to the memory I/F 205, to be High level. On the other hand, when the request mask signal REQ_MASK is High level, the readout request mask unit 204 causes the readout request signal RD_REQ_MASK_OUT, which is output to the memory I/F 205, to be Low level. In such a way, the coordinate comparator 203 and the readout request mask unit 204 may cooperate to function as control means that, based on the positional relationship between write coordinates and readout coordinates, controls whether or not to permit a readout request issued from the RDDMAC 213.

Upon the completion of write operation on the last pixel of one frame of image data, the WRDMAC 211 outputs a write completion signal WR_END to the coordinate comparator 203. When receiving the write completion signal WR_END, the coordinate comparator 203 causes the request mask signal REQ_MASK to be Low level so as to release the mask of the readout request signal RD_REQ. After the completion of writing of one frame of image data, the readout request signal RD_REQ output from the RDDMAC 213 is not masked by the readout request mask unit 204. Such a readout request signal RD_REQ is output to the memory I/F as the readout request signal RD_REQ_MASK_OUT.

Figure 4:
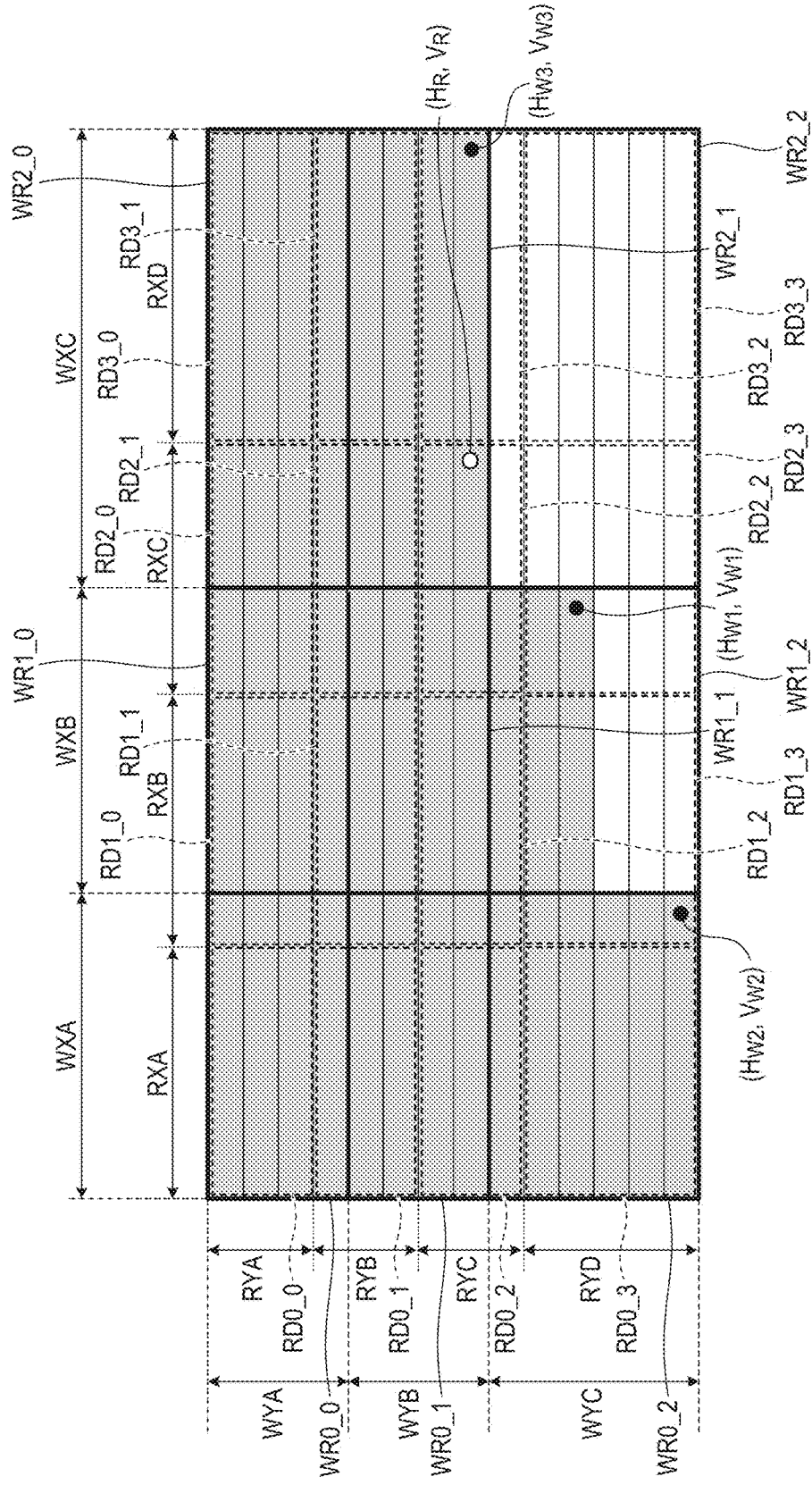
FIG. 4 is a diagram illustrating an example of a form of block division for write operation and readout operation

Details of operation performed by the chase controller 200 will be described by using FIG. 4 and FIG. 5. FIG. 4 is a diagram illustrating an example of the form of block division in write operation and readout operation. FIG. 4 illustrates an example in which the form of block division used for write operation and the form of block division used for readout operation are different from each other. More specifically, the size of the blocks (lines) 320 used for write operation and the size of the blocks (lines) 320 used for readout operation are different from each other. FIG. 4 corresponds to a case where the form of block division in a processor (a functional block) which performs writing of an image and the form of block division in a processor (a functional block) which performs readout of an image are different from each other in FIG. 1. The block division used for write operation is illustrated with the solid lines, and the block division used for readout operation is illustrated with the dashed lines. In the block division used for write operation, the number of divisions is set to three both in the horizontal direction and in the vertical direction, for example. That is, nine divided blocks WR0_0 to WR2_2 used for write operation are set. On the other hand, in the block division used for readout operation, the number of divisions is set to four both in the horizontal direction and in the vertical direction, for example. That is, 16 divided blocks RD0_0 to RD3_3 used for readout operation are set.

The number of pixels in the horizontal direction of write-use divided blocks (divided blocks used for writing) WR0_*, WR1_*, and WR2_* (* is an integer of 0 to 2) are denoted as WXA, WXB, and WXC, respectively. Further, the numbers of lines, that is, the numbers of pixels in the vertical direction of write-use divided blocks WR*_0, WR*_1, and WR*_2 (* is an integer of 0 to 2) are defined as WYA=4, WYB=4, and WYC=6, respectively. Note that, although it is assumed here as WTA=4, WYB=4, and WYC=6 to simplify the description, the number of lines in the vertical direction is far larger than those values in the actual implementation. The numbers of pixels in the horizontal direction of readout-use divided blocks (divided blocks used for readout) RD0_*, RD1_*, RD2_*, and RD3_* (* is an integer of 0 to 3) are denoted as RXA, RXB, RXC, and RXD, respectively. The numbers of lines, that is, the numbers of pixels in the vertical direction of readout-use divided blocks RD*_0, RD*_1, RD*_2, and RD*_3 (* is an integer of 0 to 3) are defined as RYA=3, RYB=3, RYC=3, and RYD=5, respectively. Note that, although it is assumed here as RYA=3, RYB=3, RYC=3, and RYD=5 to simplify the description, the number of lines in the vertical direction is far larger than those values in the actual implementation. However, each number of pixels in the horizontal direction of the divided blocks satisfies the following conditions (4) to (6).

$$RXA < WXA \quad (4)$$

$$(RXA+RXB) < (WXA+WXB) \quad (5)$$

$$(RXA+RXB+RXC) < (WXA+WXB+WXC) \quad (6)$$

Figure 5:
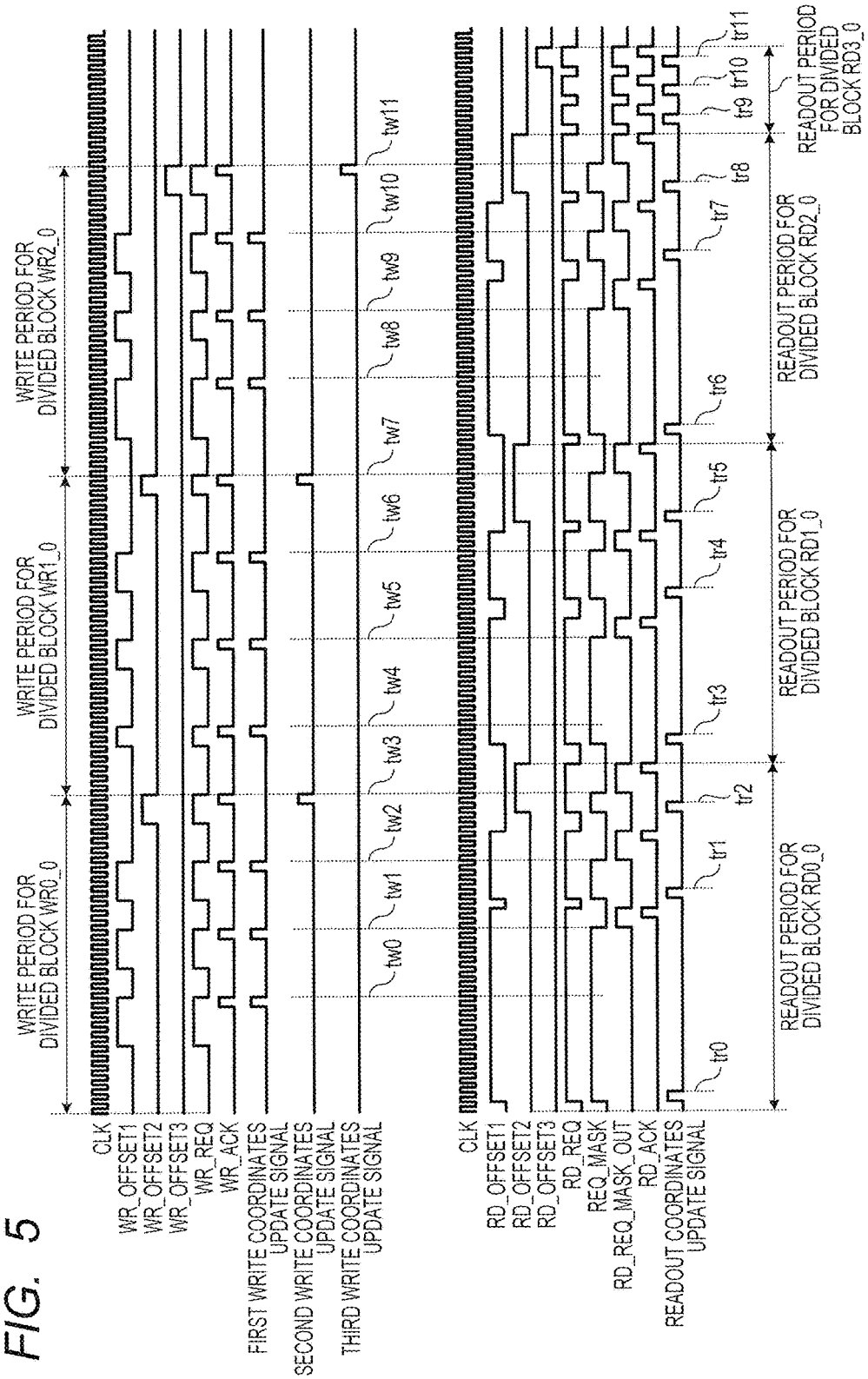
FIG. 5 is a timing chart illustrating operation of a memory controller.

FIG. 5 is a timing chart illustrating operation of the memory controller 120. FIG. 5 illustrates a period (write period) in which write operation for write-use divided blocks WR0_0 to WR2_0 is performed and a period (readout period) in which readout operation for readout-use divided blocks RD0_0 to RD3_0 is performed.

First, before write operation and readout operation for one frame of an image are started, the write coordinate calculator 201 and the readout coordinate calculator 202 are initialized. That is, in the write coordinate calculator 201, the first write coordinates ($H_{W1}$, $V_{W1}$), the second write coordinates ($H_{W2}$, $V_{W2}$), and the third write coordinates ($H_{W3}$, $V_{W3}$) are initialized to (0, 0). Further, in the readout coordinate calculator 202, the readout coordinates ($H_R$, $V_R$) are initialized to (0, 0). Then, a write period for the write-use divided block WR0_0 located at the head and a readout period for the readout-use divided block RD0_0 located at the head are started.

First, in the initial step, none of image data of the lines 320 of write-use divided block WR0_0 to WR2_2 has been written in the memory 112. Therefore, in this step, no readout of image data of the first line 320 of the readout-use divided block WR0_0 is performed as described below. That is, first, the readout request signal RD_REQ output from the RDDMAC 213 is set to High level. Further, the first readout offset signal RD_OFFSET1 output from the RDDMAC 213 becomes High level synchronized with the readout request signal RD_REQ. At the time tr0 of a falling edge of the readout coordinate update signal output in a pulse-like manner synchronized with a rising edge of the readout request signal RD_REQ, the readout coordinates ($H_R$, $V_R$) are updated by the readout coordinate calculator 202. Since the last coordinates of the first line 320 of the readout-use divided block RD0_0 are (RXA, 1), the readout coordinates ($H_R$, $V_R$) are updated to (RXA, 1). At this step, all the write coordinates ($H_{W1}$, $V_{W1}$) to ($H_{W3}$, $V_{W3}$) are (0, 0). Since none of the conditional expressions (1) to (3) described above is satisfied, the request mask signal REQ_MASK output from the coordinate comparator 203 is High level. Since the request mask signal REQ_MASK is High level, the readout request signal RD_REQ_MASK_OUT output from the readout request mask unit 204 to the memory I/F 205 is Low level. Therefore, image data of the first line 320 of the write-use divided block WR0_0 are not read out from the memory 112.

Next, image data of the first line 320 of the write-use divided block WR0_0 are written to the memory 112 as described below. That is, the write request signal WR_REQ output from the WRDMAC 211 is set to High level. The first write offset signal WR_OFFSET1 output from the WRDMAC 211 becomes High level synchronized with the write request signal WR_REQ. The acknowledge signal WR_ACK is sent back to the WRDMAC 211 from the memory I/F 205, and image data of the first line 320 of the write-use divided block WR0_0 are written to the memory 112. The write request signal WR_REQ becomes Low level synchronized with a falling edge of the acknowledge signal WR_ACK. Further, the first write offset signal WR_OFFSET1 becomes Low level synchronized with a falling edge of the write request signal WR_REQ. At the time two of a falling edge of the first write coordinate update signal synchronizing with the acknowledge signal WR_ACK, the first write coordinates ($H_{W1}$, $V_{W1}$) are updated by the write coordinate calculator 201. Since the last coordinates of the first line 320 of the write-use divided block WR0_0 are (WXA, 1), the first write coordinates ($H_{W1}$, $V_{W1}$) are updated to (WXA, 1). At this step, none of the conditional expressions (1) to (3) described above is satisfied, the request mask signal REQ_MASK issued from the coordinate comparator 203 is High level. Since the request mask signal REQ_MASK is High level, the readout request signal RD_REQ_MASK_OUT output from the readout request mask unit 204 to the memory I/F 205 is Low level. Therefore, at this step, image data written in the first line 320 of the write-use divided block WR0_0 are not read out from the memory 112. The number of pixels RXA of image data of the first line 320 of the readout-use divided block RD0_0 is smaller than the number of pixels WXA of the first line 320 of the write-use divided block WR0_0. Thus, storage of image data that can be read out is completed in the first line 320 of the readout-use divided block RD0_0. It is therefore possible at this step to read out image data of the first line 320 of the readout-use divided block RD0_0 from the memory 112. In the present embodiment, however, since readout is performed when any one of the conditional expressions (1) to (3) described above is satisfied, image data of the first line 320 of the readout-use divided block RD0_0 are not read out from the memory 112 at this step.

Next, image data of the second line 320 of the write-use divided block WR0_0 are written to the memory 112 as described below. That is, the write request signal WR_REQ is set to High level. The first write offset signal WR_OFFSET1 becomes High level synchronized with the write request signal WR_REQ. The acknowledge signal WR_ACK is sent back to the WRDMAC 211 from the memory I/F 205, and image data of the second line 320 of the write-use divided block WR0_0 are written to the memory 112. The write request signal WR_REQ becomes Low level synchronized with a falling edge of the acknowledge signal WR_ACK. The first write offset signal WR_OFFSET1 becomes Low level synchronized with a falling edge of the write request signal WR_REQ. At the time tw1 of a falling edge of the first write coordinate update signal synchronizing with the acknowledge signal WR_ACK, the first write coordinates ($H_{W1}$, $V_{W1}$) are updated by the write coordinate calculator 201. Since the last coordinates of the second line 320 of the write-use divided block WR0_0 are (WXA, 2), the first write coordinates ($H_{W1}$, $V_{W1}$) are updated to (WXA, 2). At this step, since the conditional expression (1) described above is satisfied, the request mask signal REQ_MASK issued from the coordinate comparator 203 becomes Low level. Since the request mask signal REQ_MASK is Low level, the readout request signal RD_REQ_MASK_OUT output from the readout request mask unit 204 to the memory I/F 205 becomes High level. The acknowledge signal RD_ACK is then sent back to the RDDMAC 213 from the memory I/F 205 in a pulse-like manner, and image data of the first line 320 of the readout-use divided block RD0_0 are read out from the memory 112. The readout request signals RD_REQ and the RD_REQ_MASK_OUT become Low level synchronized with a falling edge of the acknowledge signal RD_ACK. Further, the first readout offset signal RD_OFFSET1 becomes Low level synchronized with a falling edge of the readout request signal RD_REQ.

Next, the readout request signal RD_REQ is set to High level. The first readout offset signal RD_OFFSET1 becomes High level synchronized with the readout request signal RD_REQ. At the time tr1 of a falling edge of the readout coordinate update signal issued in a pulse-like manner synchronized with a rising edge of the readout request signal RD_REQ, the readout coordinates ($H_R$, $V_R$) are updated by the readout coordinate calculator 202. Because the readout from the memory 112 of image data of the first line 320 of the readout-use divided block RD0_0 has been completed, the line 320 to be read out in the next readout operation is the second line 320 of the readout-use divided block RD0_0. The last coordinates of the second line 320 of the readout-use divided block RD0_0 are (RXA, 2). Thus, the readout coordinates ($H_R$, $V_R$) are updated to (RXA, 2). At this step, the first write coordinates ($H_{W1}$, $V_{W1}$) are (WXA, 2), and both the second write coordinates ($H_{W2}$, $V_{W2}$) and the third write coordinates ($H_{W3}$, $V_{W3}$) are (0, 0). Because none of the conditional expressions (1) to (3) described above is satisfied, the request mask signal REQ_MASK issued from the coordinate comparator 203 is High level. Since the request mask signal REQ_MASK is High level, the readout request signal RD_REQ_MASK_OUT output from the readout request mask unit 204 to the memory I/F 205 is Low level. Therefore, at this step, image data of the second line 320 of the write-use divided block WR0_0 are not read out from the memory 112.

Next, image data of the third line 320 of the write-use divided block WR0_0 are written to the memory 112 as described below. That is, the write request signal WR_REQ is set to High level. The first write offset signal WR_OFFSET1 becomes High level synchronized with the write request signal WR_REQ. The acknowledge signal WR_ACK is then sent back, and image data of the third line 320 of the write-use divided block WR0_0 are written to the memory 112. The write request signal WR_REQ becomes Low level synchronized with a falling edge of the acknowledge signal WR_ACK. The first write offset signal WR_OFFSET1 becomes Low level synchronized with a falling edge of the write request signal WR_REQ. At the time tw2 of a falling edge of the first write coordinate update signal synchronizing with the acknowledge signal WR_ACK, the first write coordinates ($H_{W1}$, $V_{W1}$) are updated. Since the last coordinates of the third line 320 of the write-use divided block WR0_0 are (WXA, 3), the first write coordinates ($H_{W1}$, $V_{W1}$) are updated to (WXA, 3). At this step, since the conditional expression (1) described above is satisfied, the request mask signal REQ_MASK issued from the coordinate comparator 203 becomes Low level, and the readout request signal RD_REQ_MASK_OUT becomes High level. The acknowledge signal RD_ACK is then sent back to the RDDMAC 213, and image data of the second line 320 of the readout-use divided block RD0_0 are read out from the memory 112. The readout request signals RD_REQ and the RD_REQ_MASK_OUT become Low level synchronized with a falling edge of the acknowledge signal RD_ACK. Further, the first readout offset signal RD_OFFSET1 becomes Low level synchronized with a falling edge of the readout request signal RD_REQ.

Next, the readout request signal RD_REQ is set to High level. The second readout offset signal RD_OFFSET2 becomes High level synchronized with the readout request signal RD_REQ. At the time tr2 of a falling edge of the readout coordinate update signal issued in a pulse-like manner synchronized with a rising edge of the readout request signal RD_REQ, the readout coordinates ($H_R$, $V_R$) are updated. Because the readout of image data of the second line 320 of the readout-use divided block RD0_0 has been completed, the line 320 to be read out in the next readout operation is the third line 320 of the readout-use divided block RD0_0. The last coordinates of the third line 320 of the readout-use divided block RD0_0 are (RXA, 3). Thus, the readout coordinates ($H_R$, $V_R$) are updated to (RXA, 3). At this step, the first write coordinates ($H_{W1}$, $V_{W1}$) are (WXA, 3), and both the second write coordinates ($H_{W2}$, $V_{W2}$) and the third write coordinates ($H_{W3}$, $V_{W3}$) are (0, 0). Because none of the conditional expressions (1) to (3) described above is satisfied, the request mask signal REQ_MASK is High level, and the readout request signal RD_REQ_MASK_OUT is Low level. Therefore, at this step, image data of the third line 320 of the write-use divided block WR0_0 are not read out from the memory 112.

Next, image data of the fourth line 320 of the write-use divided block WR0_0 are written to the memory 112 as described below. That is, the write request signal WR_REQ is set to High level. The second write offset signal WR_OFFSET2 becomes High level synchronized with the write request signal WR_REQ. The acknowledge signal WR_ACK is then sent back, and image data of the fourth line 320 of the divided block WR0_0 are written to the memory 112. The write request signal WR_REQ becomes Low level synchronized with a falling edge of the acknowledge signal WR_ACK. The second write offset signal WR_OFFSET2 becomes Low level synchronized with a falling edge of the write request signal WR_REQ. At the time tw3 of a falling edge of the second write coordinate update signal synchronizing with the acknowledge signal WR_ACK, the second write coordinates ($H_{W2}$, $V_{W2}$) are updated. Since the last coordinates of the fourth line 320 of the write-use divided block WR0_0 are (WXA, 4), the first write coordinates ($H_{W1}$, $V_{W1}$) are updated to (WXA, 4). At this step, since the conditional expression (2) described above is satisfied, the request mask signal REQ_MASK issued from the coordinate comparator 203 becomes Low level, and the readout request signal RD_REQ_MASK_OUT becomes High level. The acknowledge signal RD_ACK is then sent back to the RDDMAC 213, and image data of the third line 320 of the readout-use divided block RD0_0 are read out from the memory 112. The readout request signals RD_REQ and the RD_REQ_MASK_OUT become Low level synchronized with a falling edge of the acknowledge signal RD_ACK. The second readout offset signal RD_OFFSET2 becomes Low level synchronized with a falling edge of the readout request signal RD_REQ. In such a way, readout from the memory 112 of image data of all the lines 320 located in the head readout-use divided block RD0_0 is completed.

Next, the readout request signal RD_REQ is set to High level. The first readout offset signal RD_OFFSET1 becomes High level synchronized with the readout request signal RD_REQ. At the time tr3 of a falling edge of the readout coordinate update signal issued in a pulse-like manner synchronized with a rising edge of the readout request signal RD_REQ, the readout coordinates ($H_R$, $V_R$) are updated. Because the readout from the memory 112 of image data of all the lines 320 located in the readout-use divided block RD0_0 has been completed, the line 320 to be read out in the next readout operation is the first line 320 of the readout-use divided block RD1_0. The last coordinates of the first line 320 of the readout-use divided block RD1_0 are (RXA+RXB, 1). Thus, the readout coordinates ($H_R$, $V_R$) are updated to (RXA+RXB, 1). At this step, the first write coordinates ($H_{W1}$, $V_{W1}$) are (WXA, 3), ($H_{W2}$, $V_{W2}$) are (WXA, 4), and ($H_{W3}$, $V_{W3}$) are (0, 0). Because none of the conditional expressions (1) to (3) described above is satisfied, the request mask signal REQ_MASK is High level, and the readout request signal RD_REQ_MASK_OUT is Low level. Therefore, at this step, image data of the first line 320 of the write-use divided block WR1_0 are not read out from the memory 112.

Next, image data of the first line 320 of the write-use divided block WR1_0 are written to the memory 112 as described below. That is, the write request signal WR_REQ is set to High level. The first write offset signal WR_OFFSET1 becomes High level synchronized with the write request signal WR_REQ. The acknowledge signal WR_ACK is sent back to the WRDMAC 211 from the memory I/F 205, and image data of the first line 320 of the write-use divided block WR1_0 are written to the memory 112. The write request signal WR_REQ becomes Low level synchronized with a falling edge of the acknowledge signal WR_ACK. The first write offset signal WR_OFFSET1 becomes Low level synchronized with a falling edge of the write request signal WR_REQ. At the time two of a falling edge of the first write coordinate update signal synchronized with the acknowledge signal WR_ACK, the first write coordinates ($H_{W1}$, $V_{W1}$) are updated. Since the last coordinates of the first line 320 of the write-use divided block WR1_0 are (WXA+WXB, 1), the first write coordinates ($H_{W1}$, $V_{W1}$) are updated to (WXA+WXB, 1). At this step, the readout coordinates ($H_R$, $V_R$) are (RXA+RXB, 1), and none of the conditional expressions (1) to (3) described above is satisfied. Thus, the request mask signal REQ_MASK issued from the coordinate comparator 203 is High level, and the readout request signal RD_REQ_MASK_OUT is Low level. Therefore, at this step, image data written in the first line 320 of the write-use divided block WR1_0 are not read out from the memory 112.

Next, image data of the second line 320 of the write-use divided block WR1_0 are written to the memory 112 as described below. That is, the write request signal WR_REQ is set to High level. The first write offset signal WR_OFFSET1 becomes High level synchronized with the write request signal WR_REQ. The acknowledge signal WR_ACK is sent back to the WRDMAC 211 from the memory I/F 205, and image data of the second line 320 of the write-use divided block WR1_0 are written to the memory 112. The write request signal WR_REQ becomes Low level synchronized with a falling edge of the acknowledge signal WR_ACK. The first write offset signal WR_OFFSET1 becomes Low level synchronized with a falling edge of the write request signal WR_REQ. At the time tw5 of a falling edge of the first write coordinate update signal synchronizing with the acknowledge signal WR_ACK, the first write coordinates ($H_{W1}$, $V_{W1}$) are updated by the write coordinate calculator 201. Since the last coordinates of the second line 320 of the write-use divided block WR1_0 are (WXA+WXB, 2), the first write coordinates ($H_{W1}$, $V_{W1}$) are updated to (WXA+WXB, 2). At this step, since the readout coordinates ($H_R$, $V_R$) are (RXA+RXB, 1) and the conditional expression (1) described above is satisfied, the request mask signal REQ_MASK becomes Low level and the readout request signal RD_REQ_MASK_OUT becomes High level. The acknowledge signal RD_ACK is then sent back to the RDDMAC 213 from the memory I/F 205 in a pulse-like manner, and image data of the first line 320 of the readout-use divided block RD1_0 are read out from the memory 112. The readout request signals RD_REQ and the RD_REQ_MASK_OUT become Low level synchronized with a falling edge of the acknowledge signal RD_ACK. The first readout offset signal RD_OFFSET1 becomes Low level synchronized with a falling edge of the readout request signal RD_REQ.

Since the subsequent write operation for the write-use divided block WR1_0 is the same as the write operation described above for the write-use divided block WR0_0, the description thereof will be omitted. Note that the first write coordinates ($H_{W1}$, $V_{W1}$) are updated to (WXA+WXB, 3) at the time tw6, and the second write coordinates ($H_{W2}$, $V_{W2}$) are updated to (WXA+WXB, 4) at the time tw7.

Further, since the subsequent readout operation for the readout-use divided blocks RD1_0 and RD2_0 is the same as the readout operation described above for the readout-use divided block RD0_0, the description thereof will be omitted. Note that the readout coordinates ($H_R$, $V_R$) are updated to (RXA+RXB, 2) and (RXA+RXB, 3) at the time tr4 and tr5, respectively. Further, the readout coordinates ($H_R$, $V_R$) are updated to (RXA+RXB+RXC, 1), (RXA+RXB+RXC, 2), and (RXA+RXB+RXC, 3) at the time tr6, tr7, and tr8, respectively.

Since the write operation for the write-use divided block WR2_0 is the same as the write operation described above for the write-use divided block WR0_0, the description thereof will be omitted. Note that the first write coordinates ($H_{W1}$, $V_{W1}$) are updated to (WXA+WXB+WXC, 1), (WXA+WXB+WXC, 2), and (WXA+WXB+WXC, 3) at the time tw8, tw9, and tw10, respectively. When image data of the fourth line 320 of the write-use divided block WR2_0 is written to the memory 112, the third write offset signal WR_OFFSET3 becomes High level synchronized with the write request signal WR_REQ. Further, the third write offset signal WR_OFFSET3 becomes Low level synchronized with a falling edge of the write request signal WR_REQ. At the time tw11 of a falling edge of the third write coordinate update signal synchronizing with the acknowledge signal WR_ACK, the third write coordinates ($H_{W3}$, $V_{W3}$) are updated to (WXA+WXB+WXC, 4). In readout operation for the readout-use divided block RD3_0, the readout coordinates ($H_R$, $V_R$) are updated to (RXA+RXB+RXC+RXD, 1) at the time tr9. Since the third write coordinates ($H_{W3}$, $V_{W3}$) are (WXA+WXB+WXC, 4) and the conditional expression (3) described above is satisfied, the request mask signal REQ_MASK becomes Low level and the readout request signal RD_REQ_MASK_OUT becomes High level. Therefore, readout of image data from the first line 320 of the readout-use divided block RD3_0 is performed. At the time tr10, the readout coordinates ($H_R$, $V_R$) are updated to (RXA+RXB+RXC+RXD, 2). Since the third write coordinates ($H_{W3}$, $V_{W3}$) are (WXA+WXB+WXC, 4) and the conditional expression (3) described above is satisfied, the request mask signal REQ_MASK becomes Low level and the readout request signal RD_REQ_MASK_OUT becomes High level.

Therefore, readout of image data from the second line 320 of the readout-use divided block RD3_0 is performed. At the time tr11, the readout coordinates ($H_R$, $V_R$) are updated to (RXA+RXB+RXC+RXD, 3). Since the third write coordinates ($H_{W3}$, $V_{W3}$) are (WXA+WXB+WXC, 4) and the conditional expression (3) described above is satisfied, the request mask signal REQ_MASK becomes Low level and the readout request signal RD_REQ_MASK_OUT becomes High level. Therefore, readout of image data from the third line 320 of the readout-use divided block RD3_0 is performed.

With respect to the write-use divided blocks WR0_1 to WR2_2 and the readout-use divided blocks RD0_1 to RD3_3, write operation and readout operation are performed in the same manner as described above.

Note that the dots depicted in FIG. 4 represent a state where write operation up to the third line 320 of the write-use divided block WR1_2 has been completed. In this state, the first write coordinates ($H_{W1}$, $V_{W1}$) are (WXA+WXB, 11), the second write coordinates ($H_{W2}$, $V_{W2}$) are (WXA, 14), and the third write coordinates ($H_{W3}$, $V_{W3}$) are (WXA+WXB+WXC, 8). Further, the readout coordinates ($H_R$, $V_R$) are (RXA+RXB+RXC, 8). In this state, readout of image data of the first line 320 of the readout-use divided block RD2_2 from the memory 112 has been completed. Then, when write operation proceeds and writing of image data of the first line 320 of the write-use divided block WR2_2 is performed, this results in a state where the first write coordinates ($H_{W1}$, $V_{W1}$) are (WXA+WXB+WXC, 9) and the conditional expression (1) described above is satisfied. Thus, image data of the second line 320 of the readout-use divided block RD2_2 are read out from the memory 112, and the readout coordinates ($H_R$, $V_R$) are updated to (RXA+RXB+RXC, 9).

Upon the completion of write operation for the write-use divided block WR2_2, the WRDMAC 211 turns the write completion signal WR_END to High level. In response to the write completion signal WR_END being High level, the coordinate comparator 203 stops comparison of coordinates based on the above-described conditional expressions (1) to (3) and turns the request mask signal REQ_MASK to Low level. Thereby, after the completion of write operation for the write-use divided block WR2_2, the readout request signal RD_REQ output from the RDDMAD 213 is no longer masked by the readout request mask unit 204. Therefore, after the completion of write operation for the write-use divided block WR2_2, image data of the readout-use divided block are successively read out from the memory 112.

Figure 6:
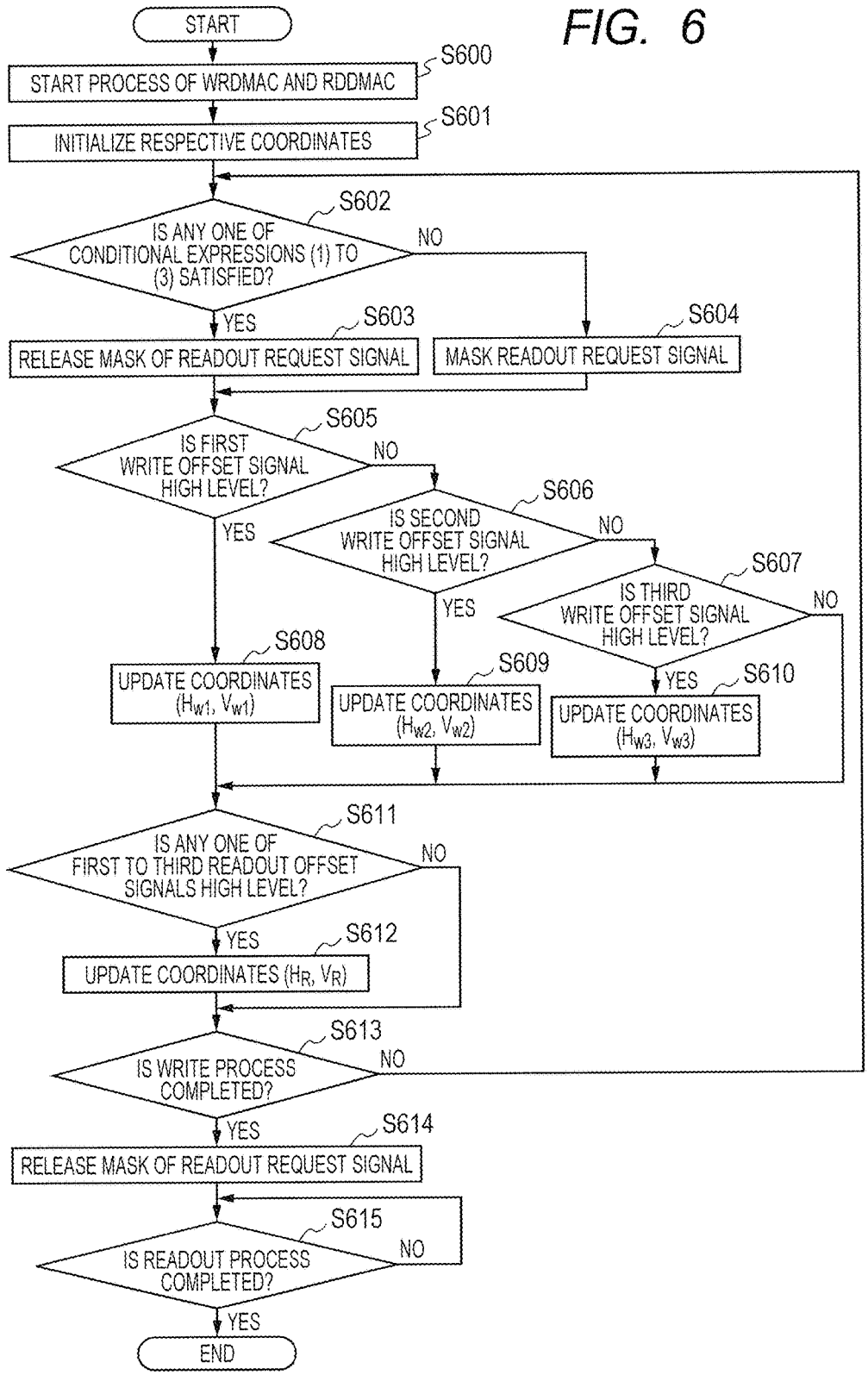
FIG. 6 is a flowchart illustrating operation of the image processing apparatus according to the embodiment.

FIG. 6 is a flowchart illustrating operation of the image processing apparatus according to the present embodiment. The process illustrated in FIG. 6 is mainly performed by the CPU 108 and the memory controller 120.

First, the CPU 108 instructs the WRDMAC 211 and the RDDMAC 213 to start the process (step S600).

Next, at the write coordinate calculator 201, the first write coordinates ($H_{W1}$, $V_{W1}$), the second write coordinates ($H_{W2}$, $V_{W2}$), and the third write coordinates ($H_{W3}$, $V_{W3}$) are initialized to (0, 0), for example. Further, at the readout coordinate calculator 202, the readout coordinates ($H_R$, $V_R$) are initialized to (0, 0), for example. The initialization of these coordinate values is performed by an instruction from the CPU 108 (step S601).

In step S602, the coordinate comparator 203 determines whether or not any one of the conditional expressions (1) to (3) described above is satisfied. If any one of the conditional expressions (1) to (3) described above is satisfied (step S602, YES), step S603 is entered. In step S603, the mask process to the readout request signal RD_REQ from the RDDMAC 213 is released by the readout request mask unit 204. If none of the conditional expressions (1) to (3) described above is satisfied (step S602, NO), step S604 is entered. In step S604, a mask process to the readout request signal RD_REQ from the RDDMAC 213 is performed by the readout request mask unit 204. Thereby, readout of image data from the memory 112 by the RDDMAC 213 is stopped.

In step S605, it is determined whether or not the first write offset signal WR_OFFSET1 output from the WRDMAC 211 is High level. If the first write offset signal WR_OFFSET1 is High level (step S605, YES), the first write coordinates ($H_{W1}$, $V_{W1}$) are updated to the coordinates of the last pixel of the line 320 where the write operation has been completed (step S608). If the first write offset signal WR_OFFSET1 is Low level (step S605, NO), step S606 is entered.

In step S606, it is determined whether or not the second write offset signal WR_OFFSET2 output from the WRDMAC 211 is High level. If the second write offset signal WR_OFFSET2 is High level (step S606, YES), the second write coordinates ($H_{W2}$, $V_{W2}$) are updated to the coordinates of the last pixel of the line 320 where the write operation has been completed (step S609). If the second write offset signal WR_OFFSET2 is Low level, step S607 is entered.

In step S607, it is determined whether or not the third write offset signal WR_OFFSET3 output from the WRDMAC 211 is High level. If the third write offset signal WR_OFFSET3 is High level, the third write coordinates ($H_{W3}$, $V_{W3}$) are updated to the coordinates of the last pixel of the line 320 where the write operation has been completed (step S610). If the third write offset signal WR_OFFSET3 is Low level, step S611 is entered.

In step S611, it is determined whether or not any one of the first to third readout offset signals RD_OFFSET1 to RD_OFFSET3 output from the RDDMAC 213 is High level. If any one of the first to third readout offset signals RD_OFFSET1 to RD_OFFSET3 is High level, the readout coordinates ($H_R$, $V_R$) are updated to the coordinates of the last pixel of the line 320 where the readout operation has been completed (step S612). If all of the first to third readout offset signals RD_OFFSET1 to RD_OFFSET3 are Low level, step S613 is entered.

In step S613, it is determined whether or not write operation has been completed. If the write operation has been completed (step S613, YES), step S614 is entered. In step S614, the mask to the readout request signal RD_REQ is released. On the other hand, if the write operation is not completed (step S613, NO), the process returns to step S602 and the same process as described above is performed.

In step S615, readout operation for the line 320 where readout is not completed is performed and it is determined whether or not the readout operation has been completed. If the readout operation is not completed (step S615, NO), the readout operation for the line 320 where the readout is not completed is continued. On the other hand, if the readout operation has been completed (step S615, YES), the chase control ends.

As discussed above, in the present embodiment, the write coordinates ($H_{W1}$, $V_{W1}$), ($H_{W2}$, $V_{W2}$), and ($H_{W3}$, $V_{W3}$) corresponding to the block (line) 320 up to which write operation has been completed and the readout coordinates ($H_R$, $V_R$) corresponding to the block 320 where readout operation is performed are compared. Then, readout is performed based on the result of the comparison of the write coordinates ($H_{W1}$, $V_{W1}$), ($H_{W2}$, $V_{W2}$), and ($H_{W3}$, $V_{W3}$) with the readout coordinates ($H_R$, $V_R$). According to the present embodiment, even when the size of the write-use blocks 320 and the size of the readout-use blocks 320 are different from each other, whether or not to perform readout is determined by comparison of coordinates and therefore readout is not performed for the block 320 where the writing is not completed. Therefore, according to the present embodiment, the image processing apparatus and the image processing method that can properly perform the chase control can be provided.

First Modified Example

Figure 8:
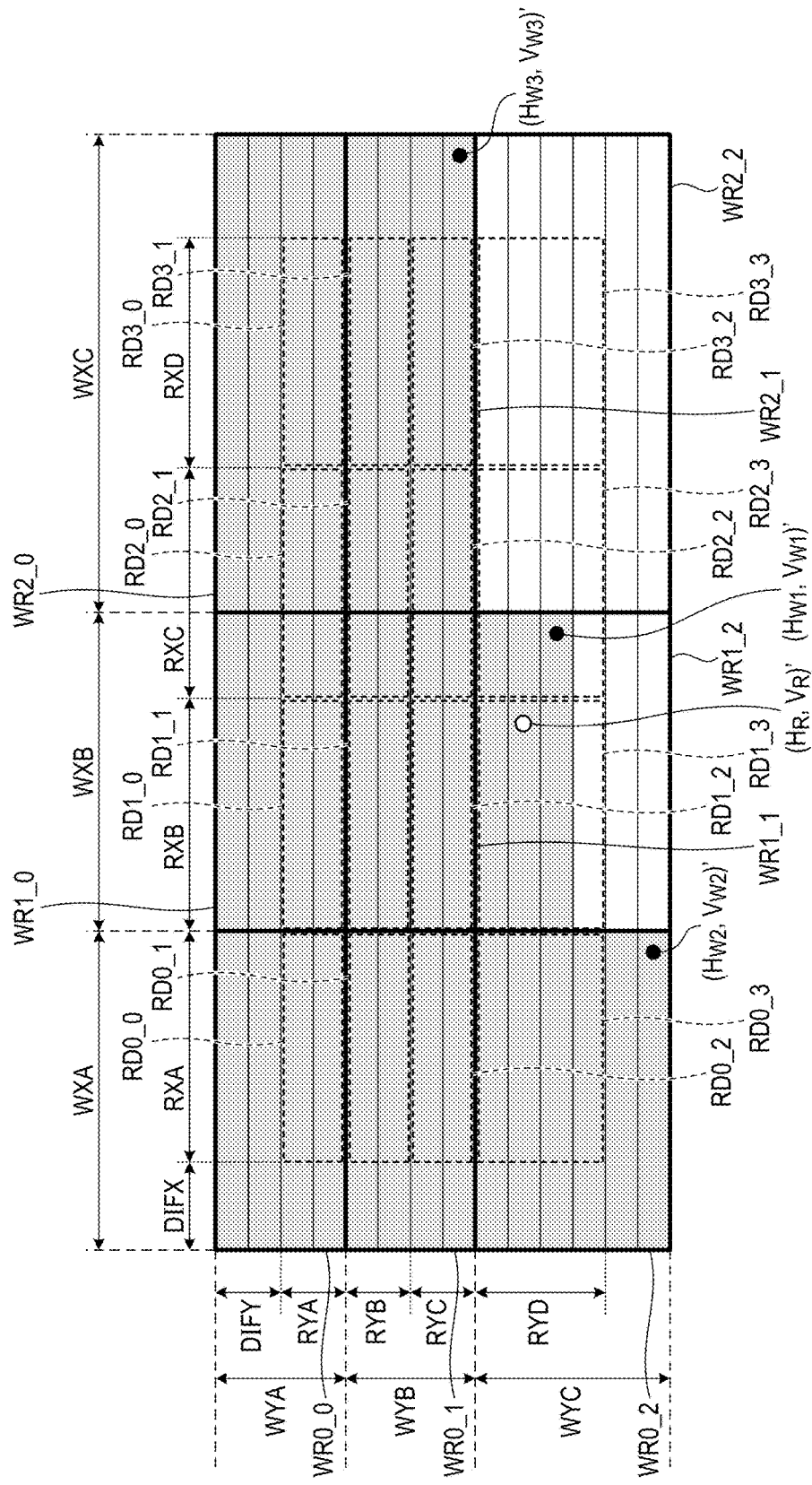
FIG. 8 is a diagram illustrating an example of a form of block division in a first modified example of the embodiment.

An image processing apparatus and an image processing method according to a first modified example of the present embodiment will be described by using FIG. 8. FIG. 8 is a diagram illustrating a form of block division in this modified example. The bold solid lines in FIG. 8 conceptually illustrate write-use divided blocks, and the bold dashed lines in FIG. 8 conceptually illustrate readout-use divided blocks.

In this modified example, the access start coordinates in write operation and the access start coordinates in readout operation are different. That is, in this modified example, the head coordinates of the first line 320 of the write-use divided block WR0_0 located at the head and the head coordinates of the first line 320 of the readout-use divided block RD0_0 located at the head are different from each other. A case where the area where readout operation is performed is smaller than the area where write operation is performed is exemplified here.

The shift difference in the horizontal direction between the access start coordinates in write operation and the access start coordinates in readout operation is denoted as DIFX. The difference in the vertical direction between the access start coordinates in write operation and the access start coordinates in readout operation is denoted as DIFY.

In this case, the first to third write coordinates ($H_{W1}$, $V_{W1}$), ($H_{W2}$, $V_{W2}$), and ($H_{W3}$, $V_{W3}$) described above may be shifted by the differences DIFX and DIFY of the access start coordinates, for example. The first to third write coordinates ($H_{W1}$, $V_{W1}$)', ($H_{W2}$, $V_{W2}$)', and ($H_{W3}$, $V_{W3}$)' shifted by the differences DIFX and DIFY of the access start coordinates are represented by the following expressions (7) to (9). Note that the access start coordinates in readout operation are (0, 0). The write coordinates ($H_{W1}$, $V_{W1}$)', ($H_{W2}$, $V_{W2}$)', and ($H_{W3}$, $V_{W3}$)' shifted by the differences DIFX and DIFY of the access start coordinates are calculated by the write coordinate calculator 201.

$$(H_{W1}, V_{W1})' = (H_{W1} - DIFX, V_{W1} - DIFY) \quad (7)$$

$$(H_{W2}, V_{W2})' = (H_{W2} - DIFX, V_{W2} - DIFY) \quad (8)$$

$$(H_{W3}, V_{W3})' = (H_{W3} - DIFX, V_{W3} - DIFY) \quad (9)$$

Note that, although the case where the write coordinates ($H_{W1}$, $V_{W1}$), ($H_{W2}$, $V_{W2}$), and ($H_{W3}$, $V_{W3}$) may be shifted by the differences DIFX and DIFY of the access start coordinates has been exemplified here, the example is not limited thereto. For example, the readout coordinates ($H_R$, $V_R$) may be shifted by the differences DIFX and DIFY of the access start coordinates. When the access start coordinates in readout operation are (0, 0), the readout coordinates ($H_R$, $V_R$)' shifted by the differences DIFX and DIFY of the access start coordinates are represented by the following equation (10). The readout coordinates ($H_R$, $V_R$)' shifted by the differences DIFX and DIFY of the access start coordinates are calculated by the readout coordinate calculator 202.

$$(H_R, V_R)' = (H_R + DIFX, V_R + DIFY) \quad (10)$$

As described above, the access start coordinates in write operation and the access start coordinates in readout operation may be different from each other.

Second Modified Example

Figure 9:
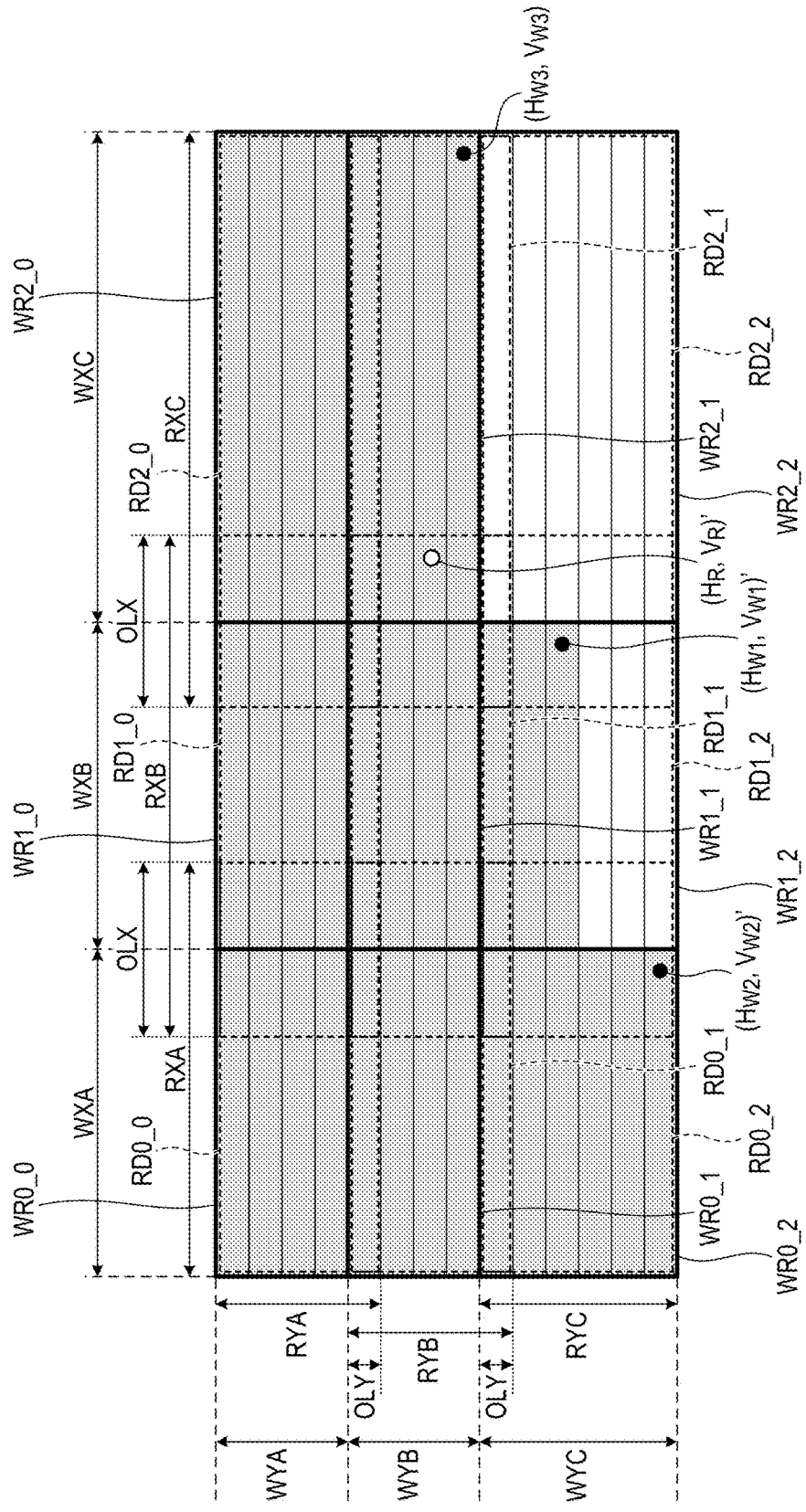
FIG. 9 is a diagram illustrating an example of a form of block division in a second modified example of the embodiment.

An image processing apparatus and an image processing method according to a second modified example of the present embodiment will be described by using FIG. 9 to FIG. 10B. FIG. 9 is a diagram illustrating a form of block division in this modified example. The bold solid lines in FIG. 9 conceptually illustrate write-use divided blocks, and the bold dashed lines in FIG. 9 conceptually illustrate readout-use divided blocks.

This modified example illustrates a case where neighboring divided blocks overlap with each other. The amount of overlap in the horizontal direction of the neighboring readout-use divided block RD*_* is denoted as OLX. The amount of overlap in the vertical direction of the neighboring readout-use divided block RD*_* is denoted as OLY.

In such a case, for example, the readout coordinates ($H_R$, $V_R$) described above may be shifted by the overlap amounts OLX and OLY when the divided block RD*_* to be read out is switched. The readout coordinates ($H_R$, $V_R$)' shifted by the overlap amounts OLX and OLY are represented by the following equation (11). The readout coordinates ($H_R$, $V_R$)' shifted by the overlap amounts OLX and OLY are calculated by the readout coordinate calculator 202.

$$(H_R, V_R)' = (H_R - OLX, V_R - OLY) \quad (11)$$

As discussed above, neighboring divided blocks may overlap with each other. Note that, although a case where the neighboring readout-use divided blocks RD*_* overlap with each other has been exemplified here, neighboring write-use divided blocks WR*_* may overlap with each other.

FIG. 10A and FIG. 10B are diagrams conceptually illustrating jumps of access coordinates when access reaches the end of a divided block. FIG. 10A illustrates a case where neighboring divided blocks 300a to 300c overlap with each other in the horizontal direction. When the access reaches the pixels 311 and 312 at the last coordinates ($H_2$, $V_2$) of the divided blocks 300a and 300b, addition of an offset value to an address value is performed in the same manner as in the image processing apparatus according to the first embodiment described above by using FIG. 3. The offset value added here is (−XH×(YA−1)−OLX).

FIG. 10B illustrates a case where neighboring divided blocks 300d to 300i overlap with each other in both the horizontal direction and the vertical direction. When the access reaches the pixel 316 at the last coordinates ($H_3$, $V_3$) of the block line 321b, addition of an offset value to an address value is performed in the same manner as in the image processing apparatus according to the first embodiment described above by using FIG. 3. The offset value added here is (−XH×OLY).

As discussed above, neighboring divided blocks may overlap with each other. Also in this modified example, the image processing apparatus that can properly perform the chase control on the memory 112 can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, in the embodiment described above, the case where writing or readout of image data for one line 320 corresponding to the number of pixels in the horizontal direction of divided blocks is performed by one time of write operation or one time of readout operation has been exemplified. That is, the case where write operation or readout operation of image data for one line 320 is performed by one time of the write request signal WR_REQ or one time of the readout request signal RD_REQ has been exemplified. However, the embodiment is not limited thereto. Writing or readout of image data for one line 320 may be performed multiple divided times. That is, write operation or readout operation of image data for one line 320 may be performed by multiple times of the write request signals WR_REQ or multiple times of the readout request signals RD_REQ. Even in the case described above, the time when the write offset signal WR_OFFSET or the readout offset signal RD_OFFSET becomes High level is the time when the write operation or the readout operation reaches the last pixel of each of the lines 320.

Further, although the case where readout operation is performed when any one of the above-described conditional expressions (1) to (3) is satisfied has been exemplified in the embodiment described above, the conditional expressions to be used are not limited to (1) to (3) described above. For example, the following conditional expressions (12) to (14) may be used instead of the conditional expressions (1) to (3) described above. In this case, readout operation is performed with a delay of $L_{GAP}$.

$$H_{W1} \geq H_R, \text{ and } V_{W1} > (V_R + L_{GAP}) \quad (12)$$

$$H_{W2} \geq H_R, \text{ and } V_{W2} > (V_R + L_{GAP}) \quad (13)$$

$$H_{W3} \geq H_R, \text{ and } V_{W3} > (V_R + L_{GAP}) \quad (14)$$

Further, the following conditional expressions (15) to (17) may be used instead of the conditional expressions (1) to (3) described above. In this case, readout operation can be performed immediately on the line 320 where readout operation is enabled.

$$H_{W1} \geq H_R, \text{ and } V_{W1} \geq V_R \quad (15)$$

$$H_{W2} \geq H_R, \text{ and } V_{W2} \geq V_R \quad (16)$$

$$H_{W3} \geq H_R, \text{ and } V_{W3} \geq V_R \quad (17)$$

Further, in the embodiment described above, the case where writing or the like of the divided blocks 300a to 300c is sequentially performed, writing or the like of the divided blocks 300d to 300f is sequentially performed, and writing or the like of the divided blocks 300g to 300i is then sequentially performed has been exemplified. However, the embodiment is not limited thereto. For example, writing or the like of the divided blocks 300a, 300d, and 300g may be sequentially performed, writing or the like of the divided blocks 300b, 300e, and 300h may be sequentially performed, and then writing or the like of the divided blocks 300c, 300f, and 300i may be sequentially performed.

Further, although the case where the blocks (lines) 320 are arranged in the horizontal direction has been exemplified in the embodiment described above, the blocks (lines) 320 may be arranged in the vertical direction.

Further, in the embodiment described above, the case where the address to which data of the pixel at the left-upper end of one frame of an image is written is the head address in the address area to which such the image data is written has been exemplified. Further, the case where the address to which data of the pixel located at the right-under end of the image is written is the last address in the address area to which such the image data is written has been exemplified. However, the embodiment is not limited thereto. For example, the address to which data of the pixel at the left-under end of one frame of an image is written may be the head address in the address area to which such the image data is written. Further, the address to which data of the pixel located at the right-upper end of such the image is written may be the last address in the address area to which such the image data is written.

This application claims the benefit of Japanese Patent Application No. 2016-095943, filed May 12, 2016, which is hereby incorporated by reference herein in its entirety.

What is claimed is:

1. An image processing apparatus comprising:
a writing unit configured to write image data to a memory, wherein a plurality of first blocks are included in one frame of image data written by the writing unit to the memory;
a reading unit configured to output a readout request for image data written by the writing unit to the memory and reads out the image data from the memory in response to the readout request being permitted, wherein, while image data of one frame is being written to the memory by the writing unit, the reading unit outputs a readout request for the image data of one frame written in the memory, and wherein a plurality of second blocks each having a different size from each of the first blocks are included in one frame of image data read out by the reading unit from the memory;
a first acquisition unit configured to, in response to writing of a pixel at a predetermined position of the plurality of first blocks included in the one frame of image data being performed to the memory by the writing unit, acquire write coordinates corresponding to the position of the pixel up to which the writing is completed;

a second acquisition unit configured to acquire readout coordinates corresponding to a position of the second block where readout is to be performed of the plurality of second blocks included in the image data written in the memory; and a controller configured to control whether or not to permit the readout request from the reading unit based on a positional relationship between the write coordinates acquired by the first acquisition unit and the readout coordinates acquired by the second acquisition unit, wherein the controller performs control so as not to permit the readout request from the reading unit if the positional relationship between the write coordinates and the readout coordinates does not satisfy a predetermined condition.

2. The image processing apparatus according to claim 1, wherein the first acquisition unit acquires a first write coordinates corresponding to a position of a latest written line in one of the first blocks to be written, a second write coordinates corresponding to a position of an end of a latest first block of the first blocks where all the pixels included in the first blocks have been written, and a third write coordinates corresponding to a position of an end of the latest first block of the written first blocks at an end of a frame, and when the first write coordinates and the readout coordinates do not satisfy a first condition, the second write coordinates and the readout coordinates do not satisfy a second condition, and the third write coordinates and the readout coordinates do not satisfy a third condition, the controller performs control so as not to permit the readout request from the reading unit.

3. The image processing apparatus according to claim 2, wherein the first write coordinates include a coordinate Hw1 in a horizontal direction and a coordinate Vw1 in a vertical direction, the second write coordinates include a coordinate Hw2 in the horizontal direction and a coordinate Vw2 in the vertical direction, the third write coordinates include a coordinate Hw3 in the horizontal direction and a coordinate Vw3 in the vertical direction, and the readout coordinates include a coordinate Hr in the horizontal direction and a coordinate Vr in the vertical direction, and the first condition is that Hw1 is greater than or equal to Hr and Vw1 is greater than Vr, the second condition is that Hw2 is greater than or equal to Hr and Vw2 is greater than Vr, and the third condition is that Hw3 is greater than or equal to Hr and Vw3 is greater than Vr.

4. The image processing apparatus according to claim 1, wherein the first acquisition unit acquires the write coordinates based on a write request output from the writing unit, and the second acquisition unit acquires the readout coordinates based on a readout request output from the reading unit.

5. The image processing apparatus according to claim 1, wherein the writing unit writes the plurality of first blocks included in the one frame of image data to the memory in a predetermined order, and the reading unit reads out the plurality of second blocks included in the one frame of image data from the memory in the predetermined order.

6. The image processing apparatus according to claim 1, wherein, when writing of all the plurality of first blocks of the one frame is completed, the controller permits the readout request from the reading unit regardless of the positional relationship between the write coordinates and the readout coordinates.

7. The image processing apparatus according to claim 1, wherein the writing unit outputs multiple times of write requests in order to write image data of the first blocks, and the first acquisition unit acquires the write coordinates every time of writing due to one time of the write request.

8. The image processing apparatus according to claim 1, wherein coordinates where writing is started by the writing unit in one frame and coordinates where readout is started by the reading unit in one frame are different from each other.

9. The image processing apparatus according to claim 8, wherein the second acquisition unit acquires the write coordinates based on a positional relationship between coordinates where writing is started by the writing unit and coordinates where readout is started by the reading unit.

10. The image processing apparatus according to claim 1, further comprising:

an image capturing unit;

a first processor configured to perform a process on image data acquired by the image capturing unit; and a second processor configured to perform a process on image data read out by the reading unit;

wherein the writing unit writes image data output from the first processor to the memory, and the reading unit outputs image data read out from the memory to the second processor.

11. An image processing method comprising:

writing image data to a memory, wherein a plurality of first blocks are included in one frame of image data written to the memory;

outputting a readout request for image data written in the memory and reading out the image data from the memory in response to the readout request being permitted, wherein, while image data of one frame is being written to the memory, a readout request for the image data of one frame written in the memory is output, and wherein a plurality of second blocks each having a different size from each of the first blocks are included in one frame of image data read out from the memory;

in response to writing of a pixel at a predetermined position of the plurality of first blocks included in the one frame of image data being performed to the memory, acquiring write coordinates corresponding to the position of the pixel up to which the writing is completed;

acquiring readout coordinates corresponding to a position of the second block where readout is to be performed of the plurality of second blocks included in the image data written in the memory; and controlling whether or not to permit the readout request based on a positional relationship between the write coordinates and the readout coordinates, wherein control is performed so as not to permit the readout request if the positional relationship between the write coordinates and the readout coordinates does not satisfy a predetermined condition.

* * * * *